(12) United States Patent
Singhal et al.

(10) Patent No.: US 11,388,136 B2
(45) Date of Patent: Jul. 12, 2022

(54) DYNAMIC DISTRIBUTED SERVICE LOCATION DISCOVERY

(71) Applicant: Nutanix, Inc., San Jose, CA (US)

(72) Inventors: Pravin Singhal, Cupertino, CA (US); Gayathri Baskaran, Fremont, CA (US)

(73) Assignee: Nutanix, Inc.

( * ) Notice: Subject to any disclaimer, the term of this patent is extended or adjusted under 35 U.S.C. 154(b) by 0 days.

(21) Appl. No.: 16/528,139

(22) Filed: Jul. 31, 2019

(65) Prior Publication Data

US 2020/0403911 A1    Dec. 24, 2020

Related U.S. Application Data

(60) Provisional application No. 62/863,200, filed on Jun. 18, 2019.

(51) Int. Cl.
*H04L 61/4541* (2022.01)
*H04L 45/00* (2022.01)
*H04L 61/5007* (2022.01)
*H04L 67/51* (2022.01)

(52) U.S. Cl.
CPC ......... *H04L 61/1541* (2013.01); *H04L 45/34* (2013.01); *H04L 61/2007* (2013.01); *H04L 67/16* (2013.01)

(58) Field of Classification Search
CPC .................................................. H04L 61/1541
See application file for complete search history.

(56) References Cited

U.S. PATENT DOCUMENTS

| 5,715,386 A | 2/1998 | Fulton, III et al. |
| 7,890,714 B1 | 2/2011 | Tsaur et al. |
| 8,438,347 B1 | 5/2013 | Tawri et al. |
| 8,549,518 B1 | 10/2013 | Aron et al. |

(Continued)

FOREIGN PATENT DOCUMENTS

| CN | 105933448 A | 9/2016 |
| WO | WO 2018197928 A1 | 11/2018 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Jason E Mattis
(74) *Attorney, Agent, or Firm* — Vista IP Law Group, LLP

(57) ABSTRACT

Methods, systems and computer program products for distributed computing systems. Techniques for dynamic service location discovery operate in environments having a first computing system that hosts a client and a second computing system that hosts a service. A service discovery request is transmitted from the first computing system to access a service that is hosted at the second computing system. An IP address corresponding a next IP hop on a route to the IP address of the service is resolved. After traversing the next IP hop, the second computing system that hosts the service receives the service discovery request and responds with an IP address of the service. In accordance with these techniques, the determination of the IP address of the service is performed at a computing system that is different from the first computing system.

24 Claims, 13 Drawing Sheets

(56) References Cited

U.S. PATENT DOCUMENTS

| | | | |
|---|---|---|---|
| 8,554,918 | B1 | 10/2013 | Douglis |
| 8,601,473 | B1 | 12/2013 | Aron et al. |
| 8,850,130 | B1 | 9/2014 | Aron et al. |
| 8,966,027 | B1 | 2/2015 | Brandwine et al. |
| 9,509,782 | B2 | 11/2016 | Lawson et al. |
| 9,772,866 | B1 | 9/2017 | Aron et al. |
| 10,152,268 | B1 | 12/2018 | Chakraborty et al. |
| 2003/0050966 | A1 | 3/2003 | Dutta et al. |
| 2003/0099237 | A1* | 5/2003 | Mitra ............... H04L 45/64 370/393 |
| 2006/0087986 | A1* | 4/2006 | Dube ............... H04L 41/12 370/255 |
| 2006/0114903 | A1 | 6/2006 | Duffy, IV et al. |
| 2006/0206586 | A1* | 9/2006 | Ling ............... H04L 61/303 709/219 |
| 2012/0023179 | A1 | 1/2012 | Bernbo et al. |
| 2012/0226712 | A1 | 9/2012 | Vermeulen et al. |
| 2015/0234907 | A1 | 8/2015 | Shinohara et al. |
| 2016/0127234 | A1* | 5/2016 | Vanska ............... G06Q 30/06 709/238 |
| 2016/0142248 | A1 | 5/2016 | Thubert et al. |
| 2016/0323379 | A1 | 11/2016 | Kidambi et al. |
| 2016/0364440 | A1 | 12/2016 | Lee et al. |
| 2017/0048169 | A1 | 2/2017 | Hunt et al. |
| 2017/0154092 | A1 | 6/2017 | Reimer et al. |
| 2017/0187785 | A1 | 6/2017 | Johnson et al. |
| 2017/0346760 | A1 | 11/2017 | Kelly |
| 2018/0011874 | A1 | 1/2018 | Lacapra et al. |
| 2018/0109467 | A1 | 4/2018 | Miller |
| 2018/0357055 | A1 | 12/2018 | Apte et al. |
| 2018/0365008 | A1 | 12/2018 | Chandramouli et al. |
| 2019/0026085 | A1 | 1/2019 | Bijani et al. |
| 2019/0354438 | A1 | 11/2019 | Mohanta et al. |
| 2020/0084284 | A1* | 3/2020 | Chauhan ............. H04L 12/4641 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "TheNutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Cano, I et al., "Curator: Self-Managing Storage for Enterprise Clusters", *14th USENIX Symposium on Networked Systems Design and Implementation, NSDI' 17*, (Mar. 27, 2017).

Henry, A., "How to Migrate Mainframe Batch to Cloud Microservices", Blu Age Blog, (Mar. 9, 2018).

Kublr Team, "How to Modernize Legacy Applications for a Microservices-Based Deployment", Kublr Blog, (Jan. 29, 2018).

Delimon, J et al., "DNS for External Web Services", Microsoft TechNet, (Mar. 27, 2012).

Kelley, S., "dnsmasq", Wikipedia, (Last edited on Dec. 24, 2018).

Commvault, "Commvault Software: Enterprise Cloud Backup and Archive, Simplified", (Jul. 2017).

Plotka, B., "Introducing kEdge: a fresh approach to cross-cluster communication.", Improbable news and blog, (Mar. 19, 2019).

Kubernetes, "Cross-cluster Service Discovery using Federated Services", Kubernetes, (Mar. 12, 2019).

Cilium, "Deep Dive into Cilium Multi-cluster", Cilium blog, (Mar. 18, 2019).

Kloudless, "Kloudless Announces Support for Docker: Deploy Self-Hosted Kloudless Enterprise as a Container", PRNewswire, (Sep. 14, 2016).

Thorman, D., "Level Up: A Guide to Kloudless Enterprise Clustering (III of III)", Kloudless blog, (Sep. 28, 2015).

Lombardi, P., "Set up a production-quality Kubernetes cluster on AWS in 15 minutes", Microservices Architecture Guide, (Mar. 2, 2017).

Non-Final Office Action dated Mar. 5, 2020 for U.S. Appl. No. 16/051,467.

Final Office Action dated Sep. 9, 2020 for U.S. Appl. No. 16/051,467.

Non-Final Office Action dated Dec. 24, 2020 for U.S. Appl. No. 16/051,467.

Final Office Action dated Apr. 15, 2021 for U.S. Appl. No. 16/051,467.

Notice of Allowance dated Aug. 4, 2021 for U.S. Appl. No. 16/051,467.

\* cited by examiner

DYNAMIC DISTRIBUTED SERVICE LOCATION DISCOVERY

RELATED APPLICATIONS

The present application claims the benefit of priority to U.S. Patent Application Ser. No. 62/863,200 titled "DYNAMIC DISTRIBUTED SERVICE LOCATION DISCOVERY", filed on Jun. 18, 2019, which is hereby incorporated by reference in its entirety.

FIELD

This disclosure relates to distributed computing systems, and more particularly to techniques for dynamic distributed service (e.g., web service, microservice) location discovery.

BACKGROUND

As computer networking has evolved, so have mechanisms for invoking "calls" to routines that perform certain computing operations. In former times, when a computing process (e.g., application) needed to repeatedly perform some function or set of operations, the process would call a subroutine that was linked into the physical address space of the process. This tightly coupled relationship between the process and the subroutine presented many limitations. For example, a copy of the subroutine would often need to be deployed with every instance of the process (e.g., application). As such, updates to the subroutine and/or additions of new subroutines might impact all deployed instances of the process.

The foregoing approaches involving subroutines or "calls" that perform some function or set of operations have been supplanted by the advent of today's computer networking capabilities in combination with services (e.g., web services, microservices, etc.) that can be called over those computer networks. Such services are resources that are accessible over machine-to-machine networking protocols to perform certain functions or sets of operations. For example, web services hosted on one machine can be called by clients (e.g., processes, applications, other web services, etc.) hosted on another machine via messages having any number or format of arguments. The results produced by the web services are returned to the clients using any variety of messages or mechanisms.

The foregoing services expose one or more endpoints that are configured to accept calls, possibly including arguments, from clients. An endpoint is often represented by a uniform resource identifier (URI) that can be used to initiate performance of a service. Clients need to know certain information about the endpoint and about how to interface with the service before they can utilize the service. For example, a client might need to know the URI and a synopsis of the calling arguments that are associated with a web service. Such web services or associated agents often package such endpoint information in a file (e.g., WSDL file) to share with the clients. Clients then use the service endpoint information to send messages (e.g., simple object access protocol (SOAP) messages) to and receive messages (e.g., SOAP messages) from the web service.

The ease of deployment and invocation of these services has caused an explosion in available services, service hosts, microservice hosts, etc. Moreover, the ease of deployment of these services is further enhanced by the architecture of today's virtualized computing environments. In such virtualized computing environments, any of a variety of forms of services (e.g., web services, microservices, etc.) can be quickly deployed, moved and/or scaled (e.g., up or down) using virtualized entities (VEs), such as virtual machines (VMs) and/or executable containers (ECs), across multiple clusters in a distributed computing system. As examples, a web service that is first hosted on one VE might be moved to another VE, and/or a web service that is hosted on one VE for posting to an app store might be downloaded from the app store to another host VE specified by the downloader, and/or a web service that is deployed on one VE might be automatically re-deployed to additional VEs for high availability and/or load balancing purposes.

The number of clients that may want to call the services are also readily scaled using multiple VEs that are distributed over a virtualized computing environment. As earlier mentioned, such clients need information about the endpoints of the services to access the endpoints. In one approach to providing such information to clients, instances of registries that are local to the clients are implemented to keep track of the endpoint information corresponding to the services that the clients might want to access. Such registries, for example, map the names of the services to their respective endpoint information (e.g., URIs). Accordingly, a client makes a call to a service by querying a local registry to obtain the URI of the service, then the client uses the URI to access the service.

Unfortunately, each registry instance implemented in a computing environment demands constant maintenance as new services (e.g., web services and/or microservices) emerge and/or as clients are moved (e.g., from one VE to another VE), and/or as new clients are deployed within the environment. In some cases, new services are added on a daily or hourly basis, and in some cases, such services are moved and/or replicated over a large collection of hosts (e.g., machines, VEs, etc.) of a particular computing environment. As such, federating (e.g., instantiating, updating, replicating, etc.) many registries in the environment is cumbersome or not practically feasible. This problem is further exacerbated when the services are deployed over a computing environment that comprises multiple systems that are distinct according to some physical and/or logical boundary (e.g., URI domain name, high order access point, availability zone, etc.). What is needed is a way for clients to identify an endpoint of a service without having to perform ongoing federation and deployment of federated registries throughout the distributed computing environment.

SUMMARY

The present disclosure describes techniques used in systems, methods, and in computer program products for dynamic distributed web service location discovery, which techniques advance the relevant technologies to address technological issues with legacy approaches. More specifically, the present disclosure describes techniques used in systems, methods, and in computer program products for discovery of web services deployed in distributed computing environments. Certain embodiments are directed to use of a services discovery framework in a distributed computing environment so as to facilitate access to web services by clients that have no knowledge of the endpoints of the web services.

The disclosed embodiments modify and improve over legacy approaches. In particular, the herein-disclosed techniques provide technical solutions that address the technical problems attendant to maintaining (e.g., publishing, updating, etc.) information that describes the endpoints of numerous web services (e.g., microservices) deployed over highly scalable distributed computing systems. Such technical solutions involve specific implementations (i.e., data organization, data communication paths, module-to-module interrelationships, etc.) that relate to the software arts for improving computer functionality.

The herein-disclosed embodiments are technological solutions pertaining to technological problems that arise in the hardware and software arts that underlie hyperconverged computing systems. Aspects of the present disclosure achieve performance and other improvements in peripheral technical fields including (but not limited to) hyperconverged computing platform management and massively scalable computing systems.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1:
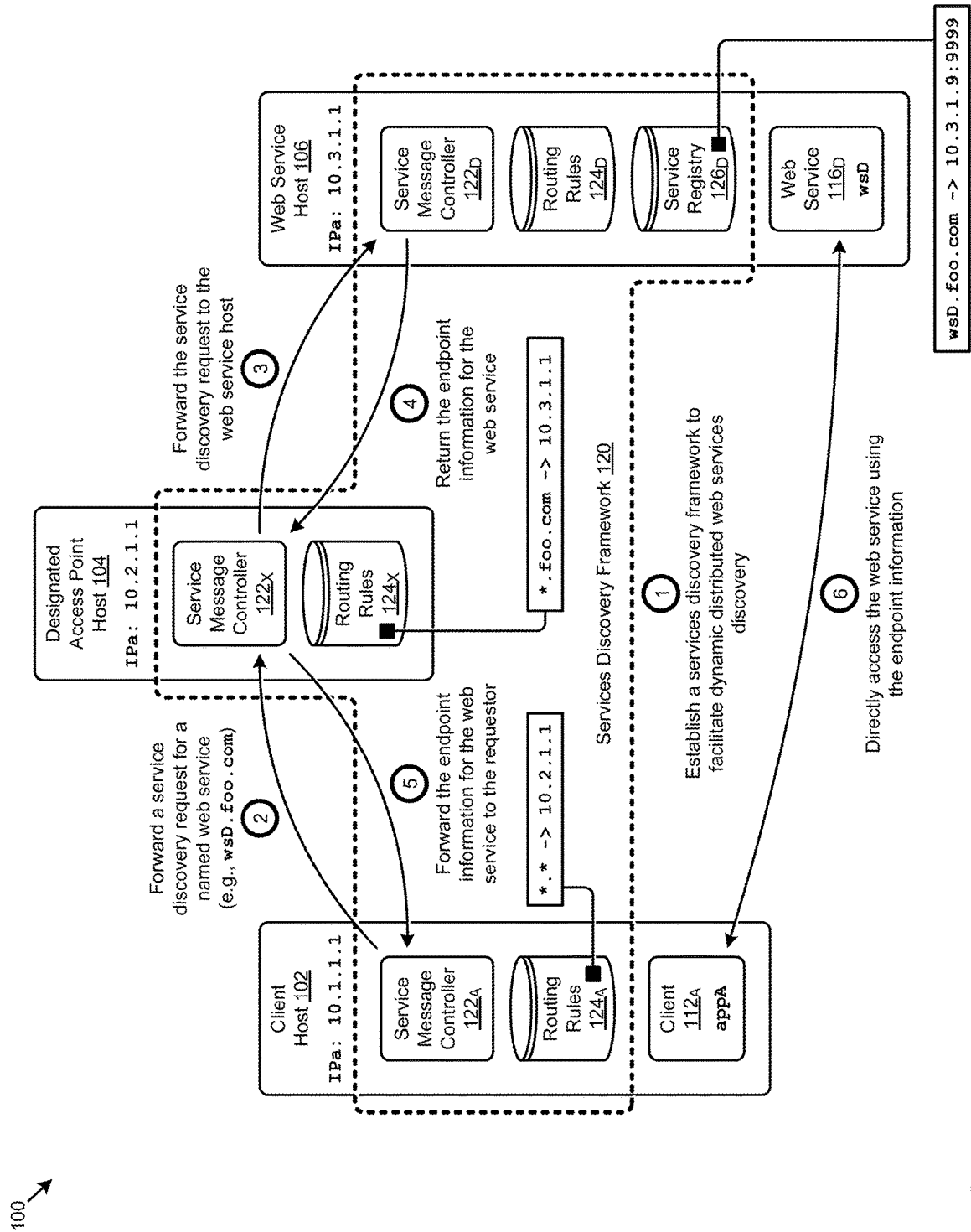
FIG. 1 illustrates a computing environment in which embodiments of the present disclosure can be implemented, according to an embodiment.

Aspects of the present disclosure solve problems associated with using computer systems for maintaining (e.g., publishing, updating, etc.) information that describes the endpoints of numerous web services (e.g., microservices) deployed over highly scalable distributed computing systems. These problems are unique to, and may have been created by, various legacy methods for maintaining (e.g., publishing, updating, etc.) information that describes the endpoints of numerous web services. Some embodiments are directed to approaches for implementing a services discovery framework in a distributed computing environment, which services discovery framework facilitates access to web services by clients that have no knowledge of the endpoints of the web services. The accompanying figures and discussions herein present example environments, systems, methods, and computer program products for discovery of web services deployed in distributed computing environments.

Overview

Disclosed herein are techniques for implementing a services discovery framework in a distributed computing environment. The services discovery framework facilitates access to web services by clients that have no knowledge of the endpoints of the web services. In certain embodiments, the services discovery framework is implemented as follows: When a computing system, such as a cluster, is deployed in the environment, an instance of a service message controller is implemented in the system. Among other operations, the service message controller routes service messages initiated or received at the system to a routing target. As an example, the service message might be initiated by a client (e.g., process, application, etc.) at a first cluster in a computing environment and the routing target might be the service message controller of a second cluster in the environment.

Respective instances of routing rules are populated at each computing system to facilitate such routing by the service message controllers. The routing rules at a particular computing system identify the routing target to which service messages at the system are to be routed, but do not identify or otherwise manage (e.g., track) the endpoint information of the web services that are associated with the service messages. Rather, using operational elements in the services discovery framework, a service registry implemented at each computing system records and manages the endpoint information associated with merely the web services hosted by that particular computing system. In certain embodiments, the respective set of routing rules for a particular service message controller may be populated such that service messages from any service message controller in the computing environment can be routed to any routing target in the computing environment.

When the service message controllers, routing rules, service registries, and other components of the services discovery framework are implemented in the computing environment, dynamic discovery of distributed web services can be performed as follows: A client (e.g., process, application, etc.) in a computing system that desires access to a particular web service will issue a service discovery request to a local instance of the service message controller implemented at the computing system. The service discovery request contains at least the name of the subject web service. The service message controller will access a local set of routing rules to identify a routing target for the request.

When the service discovery request is received by the service message controller at the routing target, the local service registry is queried (e.g., using the name of the web service) for the endpoint information of the web service. If the web service is locally hosted, the service registry will return the endpoint information, which is then returned to the client to facilitate direct access to the web service. If the web service is not locally hosted, the local set of routing rules are consulted to forward the service discovery request to the next hop on a route to the host of the web service. The request will continue to be forwarded (e.g., via additional hops) until it reaches the computing system hosting the subject web service.

When the service message controller of the host system of the subject web service receives the service discovery request, the endpoint information is retrieved from its local service registry and returned in a set of responses that traverse back through the same routing path of the request. The client then uses the endpoint information (e.g., URI of the target web service) to address the subject web service.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 illustrates a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to implementing a services discovery framework in a distributed computing environment to facilitate access to services by clients that have no knowledge of the endpoints of the services. Specifically, the figure presents a logical depiction of how the herein disclosed techniques can be implemented in a framework in a computing environment to facilitate discovery of web services deployed in the environment by clients that have no knowledge of the endpoint information associated with the web services.

A representative example of high order operations is also presented to illustrate how the herein disclosed techniques might be applied in a computing environment having a designated access point that can access other computing systems in the environment. More specifically, the representative example of FIG. 1 depicts a series of operations that can be performed to access a web service (e.g., wsD.foo.com, as shown), however the operations can be used for discovery of any other types or forms of services. The environment of FIG. 1 and representative interactions between constituent elements within the environment will now be briefly discussed.

Computing environment 100 illustrates computing entities from three representative computing systems implemented in the environment. In certain embodiments, such computing systems are distinguishable from one another by one or more characteristics. As merely one example, the computing systems might be clusters that comprise physical nodes that host one or more virtualized entities (VEs) such as virtual machines (VMs) or executable containers (ECs). In this case, the computing systems or clusters might be distinguishable by one or more networking identifiers, such as an IP address (IPa), a domain name, a subdomain name, and/or other characteristics and/or any combination thereof. The computing systems might also be distinguishable according an availability zone and/or a region. Such characteristics can often establish logical and/or physical boundaries between the computing systems that can present certain intersystem operability challenges.

One such challenge pertains to discovery of a web service hosted on one computing system by a client hosted on another computing system. As earlier mentioned, modern computing environments such as distributed virtualization computing environments, have facilitated an explosion in the deployment of web services (e.g., microservices) and the clients (e.g., processes, applications, other web services, etc.) that call the web services. When a web service is deployed, the web service or an associated agent often packages the endpoint information for accessing the web service in a file (e.g., WSDL file). However, in computing environments that have computing systems that are separated by some physical and/or logical boundary, a client hosted at one computing system may not have access to the endpoint information of a web service hosted at another computing system.

The herein disclosed techniques address the problems attendant to maintaining (e.g., publishing, updating, etc.) the endpoint information associated with web services or microservices deployed over highly scalable distributed computing systems so as to allow clients hosted over those systems to access the web services. Specifically, and as illustrated in FIG. 1, the herein disclosed techniques address such problems by implementing a services discovery framework 120 in computing environment 100 (operation 1). The services discovery framework 120 facilitates access to web services by clients that have no knowledge of the endpoint information associated with the web services. As one example depicted in FIG. 1, services discovery framework 120 facilitates access to a web service $116_D$ (e.g., web service "wsD") hosted at a web service host 106 by a client $112_A$ (e.g., application "appA") hosted at a client host 102.

In this case, client $112_A$ and client host 102 might be deployed at a first computing system (e.g., a first cluster accessed at IP address "10.1.1.1") that is separate from a second computing system (e.g., a second cluster accessed at IP address "10.3.1.1") at which web service $116_D$ and web service host 106 are implemented such that client $112_A$ has no knowledge of the endpoint information associated with web service $116_D$. As shown, computing environment 100 also has a designated access point host 104 that is associated with client host 102 and web service host 106. Referencing the foregoing example, designated access point host 104 might be implemented at a third computing system (e.g., a third cluster accessed at IP address "10.2.1.1") in computing environment 100.

As can be observed, services discovery framework 120 is implemented at least in part by deploying instances of a service message controller (e.g., service message controller $122_A$, service message controller $122_X$, and service message controller $122_D$) at each of the hosts (e.g., client host 102, designated access point host 104, and web service host 106, respectively). Among other operations, the service message controllers route service messages that are either locally initiated or that are received from a non-local initiator.

Such service messages are any electronically transmitted messages that pertain to a particular web service or group of web services. Respective instances of routing rules (e.g., routing rules $124_A$, routing rules $124_X$, and routing rules $124_D$) are populated at each host or computing system to facilitate such routing by the service message controllers. The routing rules at a particular host or computing system identify at least one routing target to route service messages that are locally initiated or received. As shown, routing rules $124_A$ includes a rule that identifies a routing target of "1.2.1.1" for service messages that reference any web service (e.g., represented by "*.*"). As another example, a representative rule from routing rules $124_X$ indicates that service messages associated with any web service at "foo.com" (e.g., represented by "*.foo.com") are to be routed to "10.3.1.1".

While the sets of routing rules in services discovery framework 120 identify routing target and/or other information, the routing rules do not identify or otherwise manage (e.g., track) the endpoint information of the web services that are associated with the service messages. Rather, local instances of a service registry (e.g., service registry $126_D$) are implemented at each computing system to record and manage the endpoint information associated with merely the web services locally hosted at each respective computing system. As such, management (e.g., storing, updating, etc.) of the endpoint information for a particular web service at any computing system other than the computing system that hosts the web service is eliminated.

When the services discovery framework 120 is implemented in computing environment 100, dynamic discovery of distributed web services can be performed over the environment. In the representative scenario of FIG. 1, a service discovery request issued by client $112_A$ for web service "wsD" (e.g., "wsD foo.com") is received by service message controller $122_A$ and routed to designated access point host 104 in accordance with routing rules $124_A$ (operation 2). Service message controller $122_X$ at designated access point host 104 accesses the routing rules $124_X$ to determine that the service discovery request is to be forwarded to web service host 106 (operation 3). Such a determination is based at least in part on the aforementioned representative rule from routing rules $124_X$ that indicates that service messages associated with any web service at "foo.com" (e.g., "wsD.foo.com") are to be routed to "10.3.1.1".

When the service discovery request is received at service message controller $122_D$ of web service host 106, service registry $126_D$ is queried (e.g., using the name "wsD" of the web service) for the endpoint information of web service. As shown, such endpoint information might indicate that web service "wsD.foo.com" can be accessed at port "9999" of "1.3.1.9". Service message controller $122_D$ returns the endpoint information to service message controller $122_X$ at designated access point host 104 (operation 4), which then forwards the endpoint information to service message controller $122_A$ and client $112_A$ at client host 102 (operation 5). Client $112_A$ can then use at least a portion of the endpoint information to directly access the web service (operation 6). As can be observed, the endpoint information can be returned in a set of responses that traverse back through the same routing path of the request. If the web service referenced in the service discovery request were not locally hosted at web service host 106, routing rules $124_D$ would be consulted by service message controller $122_D$ to determine how to forward the service discovery request to a next hop on a route to the host of the web service. The request will continue to be forwarded (e.g., via additional hops) until it reaches the computing system hosting the subject web service.

One embodiment of techniques for discovering web services deployed over a plurality of computing systems is disclosed in detail as follows.

Figure 2:
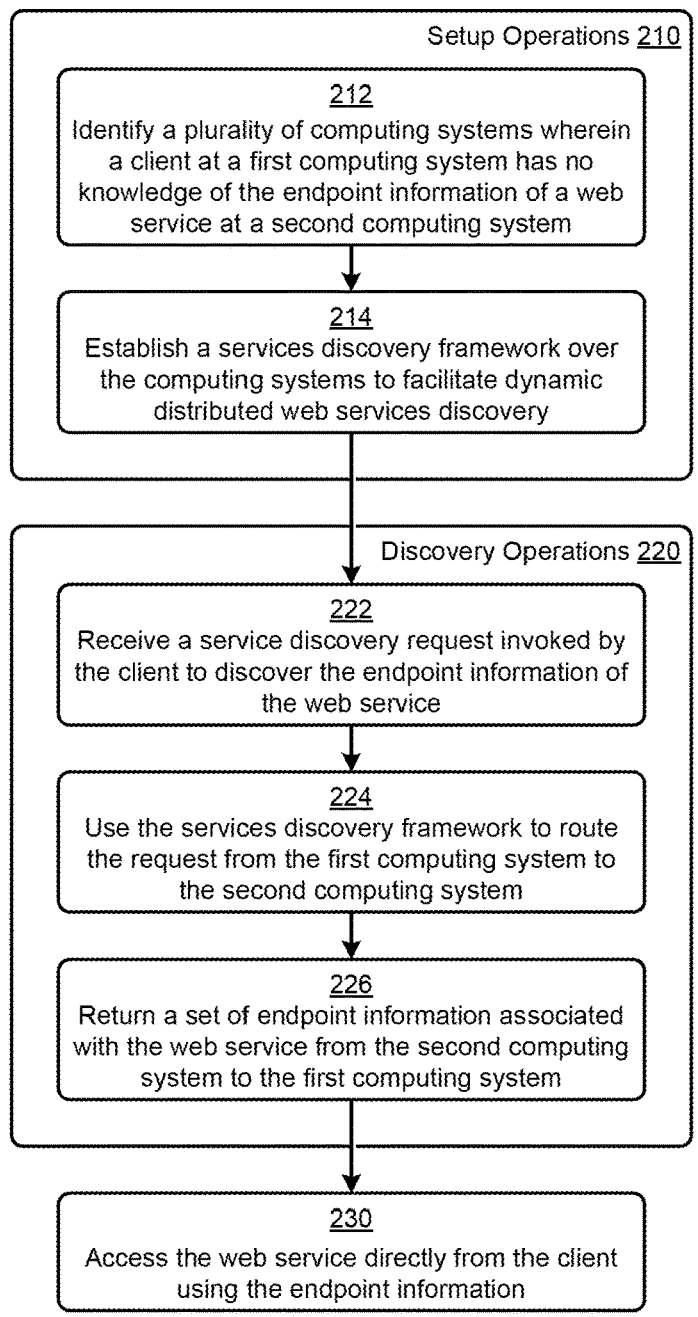
FIG. 2 depicts a distributed web services discovery technique as implemented in systems that facilitate discovery of web services deployed in distributed computing environments, according to an embodiment.

FIG. 2 depicts a distributed web services discovery technique 200 as implemented in systems that facilitate discovery of web services deployed in distributed computing environments. As an option, one or more variations of distributed web services discovery technique 200 or any aspect thereof may be implemented in the context of the architecture and functionality of the embodiments described herein. The distributed web services discovery technique 200 or any aspect thereof may be implemented in any environment.

FIG. 2 illustrates aspects pertaining to implementing a services discovery framework in a distributed computing environment to facilitate access to web services by clients that have no knowledge of the endpoints of the web services. Specifically, the figure is presented to illustrate one embodiment of certain steps and/or operations that implement the services discovery framework over various computing systems and that use the framework to dynamically discover web services deployed over the systems. As can be observed, portions of the steps and/or operations can be grouped into a set of setup operations 210 and a set of discovery operations 220.

The setup operations 210 of distributed web services discovery technique 200 commence by identifying a plurality of computing systems in a computing environment, wherein at least one client implemented at a first computing system has no knowledge of the endpoint information of at least one web service deployed at a second computing system (step 212). As earlier described, such environments often exist due to the ease of deployment of web services (e.g., microservices), clients, hosts of web services or clients (e.g., VEs), computing systems (e.g., clusters), and/or other computing environment entities. To facilitate discovery of web services distributed over the computing systems by clients in the environment, a services discovery framework is implemented over the computing systems (step 214).

More specifically, as depicted in discovery operations 220 of distributed web services discovery technique 200, the services discovery framework facilitates receiving a service discovery request from the client to discover the endpoint information of the web service (step 222). In accordance with the services discovery framework, the request is routed (e.g., forwarded) from the first computing system hosting the client to the second computing system hosting the web service (step 224). In some cases, the service discovery request might be routed over multiple computing systems before it reaches the second computing system. When the second computing system receives the service discovery request, the endpoint information associated with the web service is returned from the second computing system to the first computing system (step 226). The client at the first computing system then uses the endpoint information (e.g., URI of the web service) to directly access the web service (step 230).

The foregoing discussions include techniques for establishing a services discovery framework over a set of computing systems (e.g., clusters) in a computing environment (e.g., step 214 of FIG. 2), which techniques are disclosed in further detail as follows.

Figure 3A:
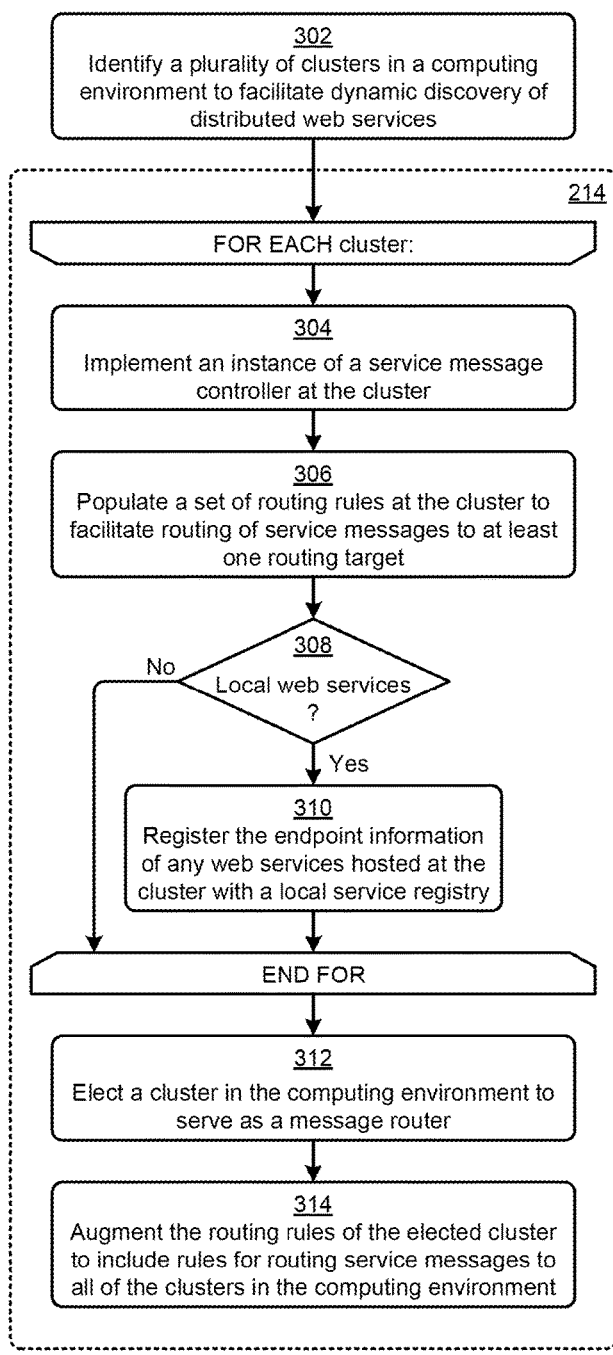
FIG. 3A presents a services discovery framework deployment technique that establishes a framework to facilitate discovery of web services deployed in distributed computing environments, according to an embodiment.
Figure 3A:
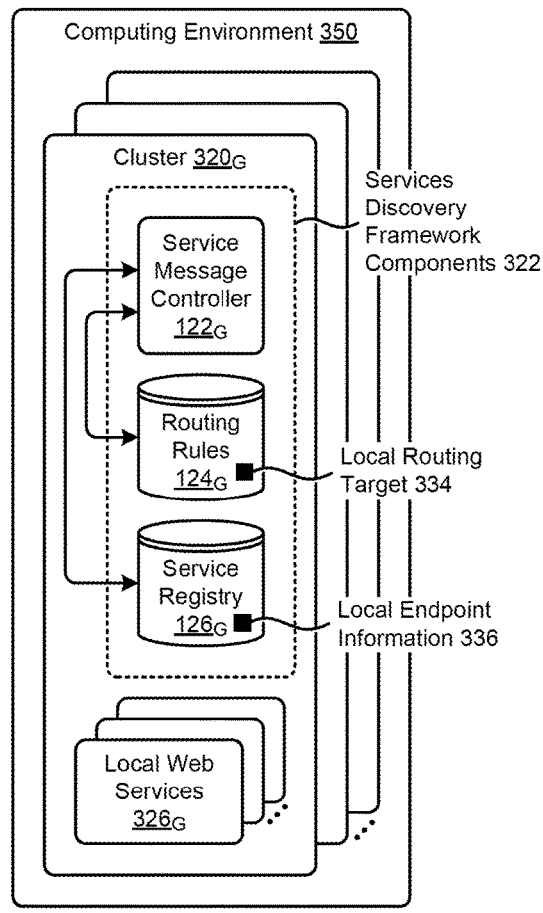

FIG. 3A presents a services discovery framework deployment technique 3A00 that establishes a framework to facilitate discovery of web services deployed in distributed computing environments. As an option, one or more variations of services discovery framework deployment technique 3A00 or any aspect thereof may be implemented in the context of the architecture and functionality of the embodiments described herein. The services discovery framework deployment technique 3A00 or any aspect thereof may be implemented in any environment.

FIG. 3A illustrates aspects pertaining to implementing a services discovery framework in a distributed computing environment to facilitate access to web services by clients that have no knowledge of the endpoints of the web services. Specifically, the figure is presented to illustrate one embodiment of certain steps and/or operations for establishing a services discovery framework over a set of computing systems in a computing environment. As depicted in the figure, at least a portion of the steps and/or operations are associated with step 214 of FIG. 2. The figure specifically depicts an embodiment in which the services discovery framework is established in a set of clusters at or near the moment in time the clusters are deployed. As such, a representative set of clusters (e.g., cluster $320_G$, etc.) in a computing environment 350 are also shown in the figure to illustrate an example application of services discovery framework deployment technique 3A00.

Services discovery framework deployment technique 3A00 commences with identifying a plurality of clusters in a computing environment that is to have capabilities for dynamic discovery of distributed web services (step 302). For example, computing environment 350 might by a virtualized distributed computing environment that supports highly scalable and portable deployment of web services and clients. As such, computing environment 350 has a need for a services discovery framework and associated techniques as disclosed herein.

For each cluster in the computing environment, at least one instance of a service message controller is implemented in the cluster (step 304). As an example, service message controller $122_G$ is implemented in cluster $320_G$ of computing environment 350. In certain embodiments, service message controller $122_G$ might be a service or some other agent that operates at a node in cluster $320_G$ that is selected and/or configured as the controlling node for the cluster. As merely one example, the service message controller might be based at least in part on a dnsmasq framework, which provides a domain name system (DNS) forwarder, a dynamic host configuration protocol (DHCP) server, router advertisement features, network boot features, and/or other capabilities.

A set of routing rules are populated at the cluster to facilitate routing of service messages (e.g., service discovery requests) to at least one routing target (step 306). For example, routing rules $124_G$ are populated with at least one local routing target 334 that can be accessed by service message controller $122_G$ to facilitate routing of service messages initiated or received at cluster $320_G$. A local routing target for a cluster is often established when the cluster is deployed and the IP address of the local routing target for the cluster is seldom modified. In some cases, the local routing target refers to a designated access point in the computing environment. In other cases, the local routing target may be a parent cluster, or a peer cluster, or an ancestor cluster, or any other cluster that is situated in a multicluster availability zone or region.

If there are any web services that are hosted locally at the cluster ("Yes" path of decision 308), then the endpoint information of the web services is registered in a local instance of a service registry (step 310). As can be observed, cluster $320_G$ hosts multiple instances of local web services $326_G$ (e.g., Kubernetes services). As such, sets of local endpoint information 336 corresponding to local web services $326_G$ are tracked by a service registry $126_G$ established at cluster $320_G$. Service message controller $122_G$ queries the service registry $126_G$ to retrieve the endpoint information for any locally hosted web services that are referenced in any received service discovery requests. If there are no locally hosted web services at the cluster, then no local service registry is established ("No" path of decision 308).

As depicted in FIG. 3A, a set of services discovery framework components 322 associated with cluster $320_G$ comprise at least service message controller $122_G$, routing rules $124_G$, and service registry $126_G$. Similar local sets of components are implemented at the other clusters in computing environment 350. The totality of all the framework components over the computing environment and the associated techniques for operating such components comprise the services discovery framework. While any of the framework components might be specific to a particular cluster, instances and/or portions (e.g., partitions, extent groups, extents, etc.) of the components may span multiple nodes within a cluster or even multiple clusters to facilitate certain availability and/or backup capabilities over the computing environment.

In some environments, a cluster in the environment is elected to serve as a designated message router for the environment (step 312). The cluster may be elected by a system administrator or automatically elected by some mechanism implemented in the computing environment. The routing rules of the elected cluster are then augmented to include rules for routing service messages to any of the clusters in the computing environment (step 314). In some environments, the elected cluster might be a designated access point that routes service messages (e.g., service discovery requests) to subordinate access points based at least on, for example, the domain and/or subdomain of the web services referenced in the messages.

As earlier mentioned, the service message routing target of a particular cluster (or computing system) might refer to a designated access point in the computing environment or to a parent cluster in a multicluster availability zone or region. A services discovery framework deployment scenario that covers these and other configurations is disclosed in further detail as follows.

Figure 3B:
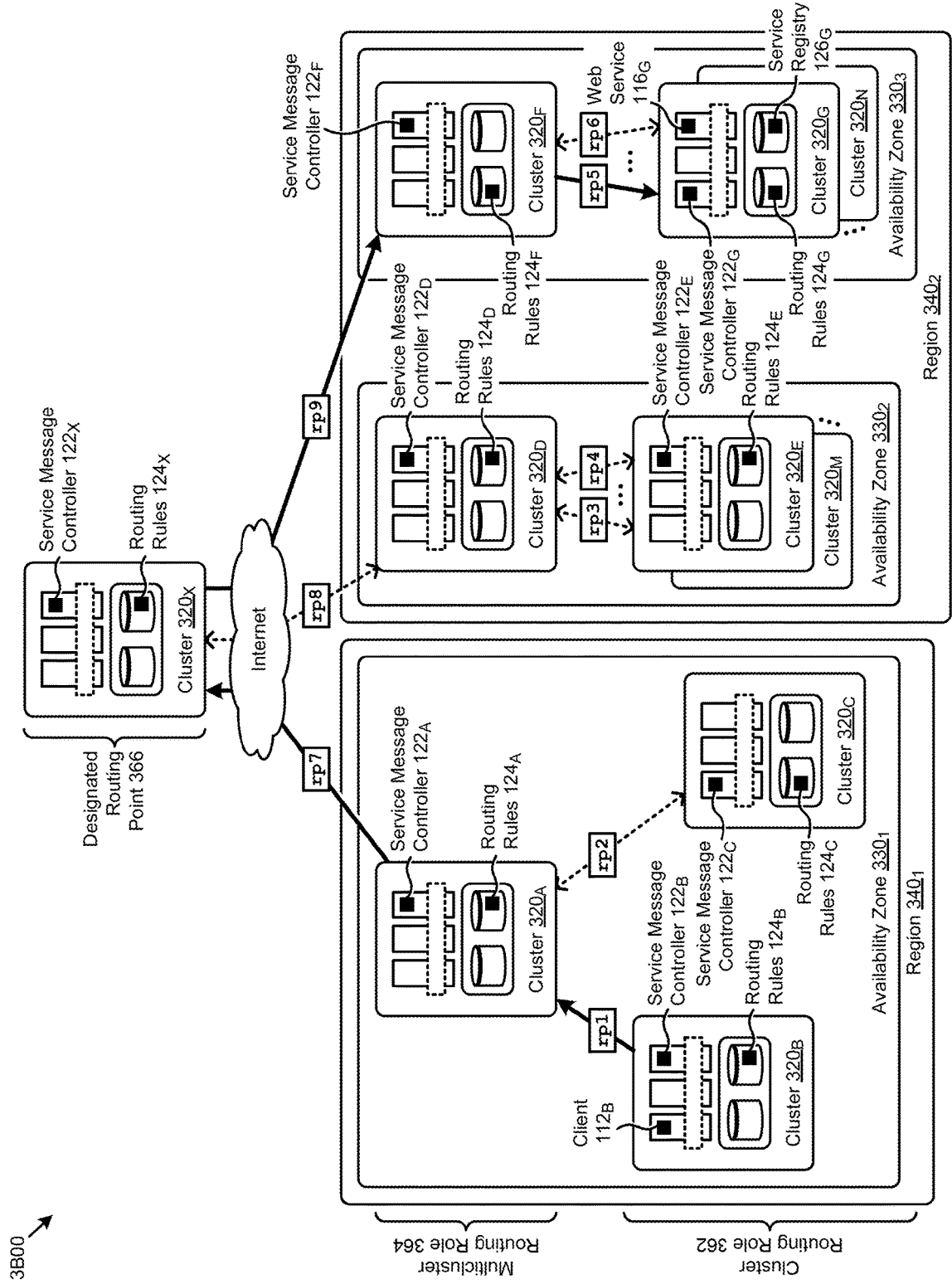
FIG. 3B illustrates a services discovery framework deployment scenario in which a framework implemented in a distributed computing environment facilitates discovery of web services deployed in the environment, according to an embodiment.

FIG. 3B illustrates a services discovery framework deployment scenario 3B00 in which a framework implemented in a distributed computing environment facilitates discovery of web services in the environment. As an option, one or more variations of services discovery framework deployment scenario 3B00 or any aspect thereof may be implemented in the context of the architecture and functionality of the embodiments described herein. The services discovery framework deployment scenario 3B00 or any aspect thereof may be implemented in any environment.

FIG. 3B illustrates aspects pertaining to implementing a services discovery framework in a distributed computing environment to facilitate access to web services by clients that have no knowledge of the endpoints of the web services. Specifically, the figure presents a logical depiction of how the services discovery framework can be implemented and used in a multicluster computing environment that includes a designated access point.

The computing environment associated with services discovery framework deployment scenario 3B00 is a multicluster computing environment comprising various representative clusters. As can be observed, multiple clusters can be associated in resource subsystems in accordance with physical and/or logical boundaries. Specifically, for example, a cluster $320_A$, a cluster $320_B$, and a cluster $320_C$ comprise a resource subsystem identified as availability zone $330_1$. A cluster $320_D$ and a cluster $320_E$ through a cluster $320_M$ are within an availability zone $330_2$. A cluster $320_F$ and a cluster $320_G$ through a cluster $320_N$ are in availability zone $330_3$. As shown, one or more availability zones can be grouped in a region.

Specifically, a region $340_1$ comprises availability zone $330_1$, and a region $340_2$ comprises availability zone $330_2$ and availability zone $330_3$. A particular cluster might also fully comprise a resource subsystem, as depicted in FIG. 3B by a cluster $320_X$. Availability zones are often logically isolated from one another—at least as pertains to certain failure events—so as to facilitate availability of resources when failures occur. For example, if a particular resource (e.g., VM, EC, etc.) is replicated over multiple availability zones, and a failure occurs at one of the availability zones, the resource can be accessed at another availability zone. Regions are also often isolated from one another to facilitate another layer of fault tolerance and/or security. In some cases, resources are not replicated automatically across regions.

According to the herein disclosed techniques, a services discovery framework can be implemented in the foregoing computing environment to facilitate dynamic discovery of web services deployed over the environment. As described herein, a plurality of service message controllers that, in part, constitute the services discovery framework are implemented over the clusters in the environment.

In some cases, the service message controllers serve various roles at the clusters. Some service message controllers (e.g., service message controller $122_B$, service message controller $122_C$, service message controller $122_E$, and service message controller $122_G$) serve a cluster routing role 362, for which a primary objective might be to route the service messages initiated or received at a single cluster. Other service message controllers (e.g., service message controller $122_A$, service message controller $122_D$, and service message controller $122_F$) serve a multicluster routing role 364, for which a primary objective might be to route service messages associated with a particular resource subsystem (e.g., availability zone). Moreover, service message controllers (e.g., service message controller $122_X$) might serve a designated routing point 366, for which a primary objective might be to route the service messages associated with multiple clusters over multiple availability zones and/or regions.

In some cases, the roles can form hierarchical tiers. For example, the service message controllers in a designated routing point might be hierarchically superior (e.g., parents) to the service message controllers in the multicluster routing role, and the service message controllers in a multicluster routing role might be hierarchically superior (e.g., parents) to the service message controllers in a cluster routing role. Each of the service message controllers are uniquely addressable over the computing environment.

In any of the foregoing cases, a service message controller facilitates the routing of service messages (e.g., service discovery requests, endpoint information responses, etc.) that are received at the service message controller. To facilitate such routing, a local set of routing rules (e.g., routing rules $124_A$, routing rules $124_B$, routing rules $124_C$, routing rules $124_D$, routing rules $124_E$, routing rules $124_F$, routing rules $124_G$, routing rules $124_X$, etc.) are populated at each cluster to identify at least one routing target for the received service messages. The routing targets identified in the local instances of the routing rules establish one or more routing paths (e.g., routing path "rp1", routing path "rp2", routing path "rp3", routing path "rp4", routing path "rp5", routing path "rp6", routing path "rp7", routing path "rp8", routing path "rp9", etc.) between the clusters in the computing environment. Various combinations of these routing paths are used to discover web services deployed over the environment. One such web service might be a web service $116_G$ deployed to cluster $320_G$. When web service $116_G$ is deployed, its endpoint information is recorded in a service registry $126_G$ that is part of the services discovery framework implemented in the multicluster computing environment.

While the endpoint information associated with web service $116_G$ is known at cluster $320_G$, the endpoint information is not known at any other cluster in the environment. To access web service $116_G$, a client, such as client $112_E$ at cluster $320_B$, will issue a service discovery request to retrieve the endpoint information associated with the web service. In this case, the service discovery request will be routed from cluster $320_B$ over the services discovery framework to retrieve the endpoint information from service registry $126_G$ at cluster $320_G$. More specifically, the service discovery request will be routed from cluster $320_B$ over routing path "rp1", routing path "rp7", routing path "rp9", and routing path "rp5" to cluster $320_G$. The retrieved endpoint information will be return over the same routing paths to client $112_E$ at cluster $320_B$. Client $112_E$ can then use the endpoint information to directly access the web service $116_G$ at cluster $320_G$.

A detailed embodiment of the data structures associated with various messages (e.g., service messages, service discovery requests, etc.) and data sets (e.g., routing rules, service registries, etc.) described herein is disclosed as follows.

Figure 4:
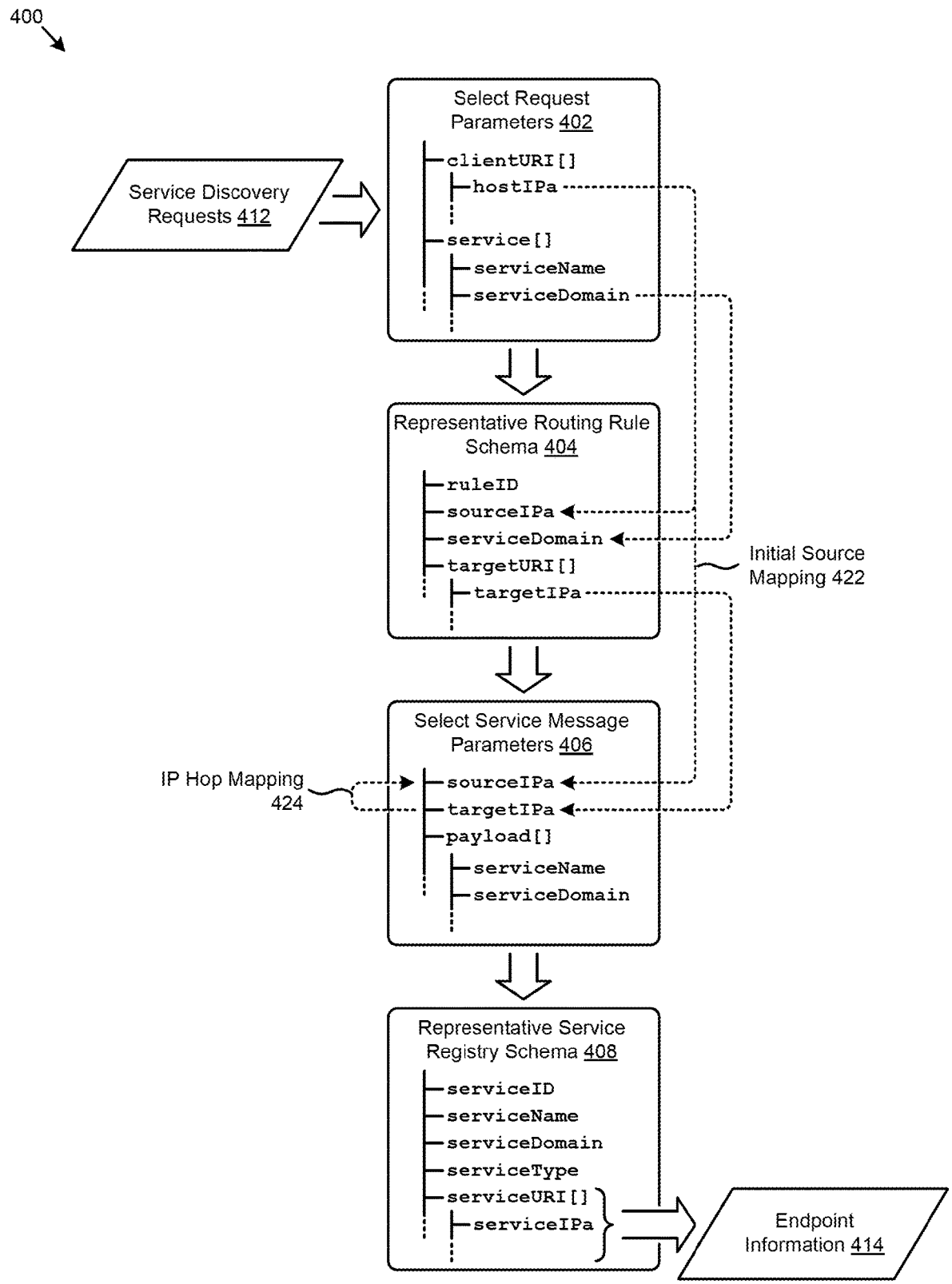
FIG. 4 is a diagrammatic representation of data structures used for discovering locations of web services deployed in distributed computing environments, according to an embodiment.

FIG. 4 is a diagrammatic representation of data structures 400 used for discovering locations of web services deployed in distributed computing environments. As an option, one or more variations of data structures 400 or any aspect thereof may be implemented in the context of the architecture and functionality of the embodiments described herein. The data structures 400 or any aspect thereof may be implemented in any environment.

FIG. 4 illustrates aspects pertaining to implementing a services discovery framework in a distributed computing environment to facilitate access to web services by clients that have no knowledge of the endpoints of the web services. Specifically, the figure presents certain specialized data structures that are designed to improve the way a computer stores and retrieves data in memory when performing the herein disclosed techniques. Such specialized data structures can be organized and/or stored using various techniques. For example, data structures 400 indicate that the underlying data might be organized and/or stored in a tabular manner (e.g., relational database table) that has rows that relate various attributes with a particular data entity. As another example, the underlying data might be organized and/or stored in a programming code object that has instances corresponding to a particular data entity and properties corresponding to the various attributes associated with the data entity. A set of representative relationships (e.g., mappings) between data structures 400 are also shown.

A set of select request parameters 402 represents at least some of the parameters that might be included in and/or derived from an instance of service discovery requests 412 issued to discover the endpoint information associated with one or more web services. As can be observed, select request parameters 402 can include various client URI attributes (e.g., stored in a "clientURI[ ]" object) such as an IP address associated with the host of the client (e.g., stored in an "hostIPa" field), and/or other attributes. Select request parameters 402 might also include certain properties of a subject web service referenced by the request (e.g., stored in a "service [ ]" object) such as the name of the subject web service (e.g., a name "wsD" stored in a "serviceName" field), a domain associated with the subject web service (e.g., a domain "foo.com" stored in a "serviceDomain" field), and/or other properties. Other parameters can be included in select request parameters 402.

In certain embodiments, one or more of the parameters of a service discovery request might be applied to a set of routing rules (e.g., by a service message controller) to determine a routing target for the request. A set of rules (e.g., rule base), such as the routing rules or any other rules described herein, comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. As depicted in a representative routing rule schema 404 for the sets of routing rules described herein, a data record (e.g., table row or object instance) for a particular routing rule might describe a rule identifier (e.g., stored in a "ruleID" field), a source IP address (e.g., stored in a "sourceIPa" field), a domain associated with a subject web service (e.g., stored in a "serviceDomain" field), a set of routing target properties (e.g., stored in a "targetURI[ ]" object), and/or other rule attributes. As shown, the routing target properties might include the IP address of the routing target (e.g., stored in a "targetIPa" field), and/or other routing target properties.

As can be observed, the "serviceDomain" and/or other parameters from the service discovery requests are applied to the routing rules to determine the "targetIPa" of the routing target. Referring to earlier described examples, a first routing rule might identify a routing target IP address of "targetIPa=10.2.1.1" for service discovery requests that reference subject web services from any domain ("serviceDomain=*.*"). A second routing rule might indicate that service discovery requests associated with the domain "foo.com" (e.g., "serviceDomain=*.foo.com") are to be routed to "targetIPa=10.3.1.1".

In certain embodiments, service messages are formed to forward various information from the service discovery requests to the routing targets identified by the routing rules. As shown in a set of select service message parameters 406, such service messages might describe an IP address associated with the source of the message (e.g., stored in a "sourceIPa" field), an IP address associated with the routing target (e.g., stored in a "targetIPa" field), a payload object (e.g., stored in a "payload" object), and/or other parameters. The payload object can comprise the name of a subject web service (e.g., stored in a "serviceName" field), a domain associated with the subject web service (e.g., stored in a "serviceDomain" field), and/or other properties. As depicted by an initial source mapping 422, the "source IPa" of a first service message forwarded in response to receiving a service discovery request might refer to the "hostIPa" of the client, whereas an IP hop mapping 424 indicates the "sourceIPa" of other (e.g., non-initial) forwarded service messages might refer to the "targetIPa" of a previously forwarded service message.

When the aforementioned service messages and/or service discovery requests have reached the host of the subject web service referenced by the service discovery requests, a local instance of a service registry is queried to retrieve the endpoint information associated with the subject web service. As shown in a representative service registry schema 408 for the service registries described herein, a data record (e.g., table row or object instance) for a particular service registry entry might describe an identifier for a subject web service (e.g., stored in a "serviceID" field), the name of the subject web service (e.g., stored in a "serviceName" field), a domain associated with the subject web service (e.g., stored in a "serviceDomain" field), a web service type (e.g., stored in a "serviceType" field), a set of web service endpoint properties (e.g., stored in a "serviceURI[ ]" object), and/or other web service attributes. As shown, the web service endpoint properties might include the IP address of the web service (e.g., stored in a "serviceIPa" field), and/or other web service endpoint properties. As can be observed, the web service endpoint properties stored in the "serviceURI[ ]" object constitute, at least in part, a set of endpoint information 414 associated with a particular web service. Endpoint information 414 might comprise other information (e.g., a uniform resource identifier, uniform resource locator, a fully qualified domain name, a port, a hostname, a path, etc.).

The foregoing discussions include techniques for performing certain discovery operations (e.g., discovery operations 220 of FIG. 2) to retrieve the endpoint information of web services distributed over a computing environment. A detailed scenario illustrating such techniques is disclosed as follows.

Figure 5:
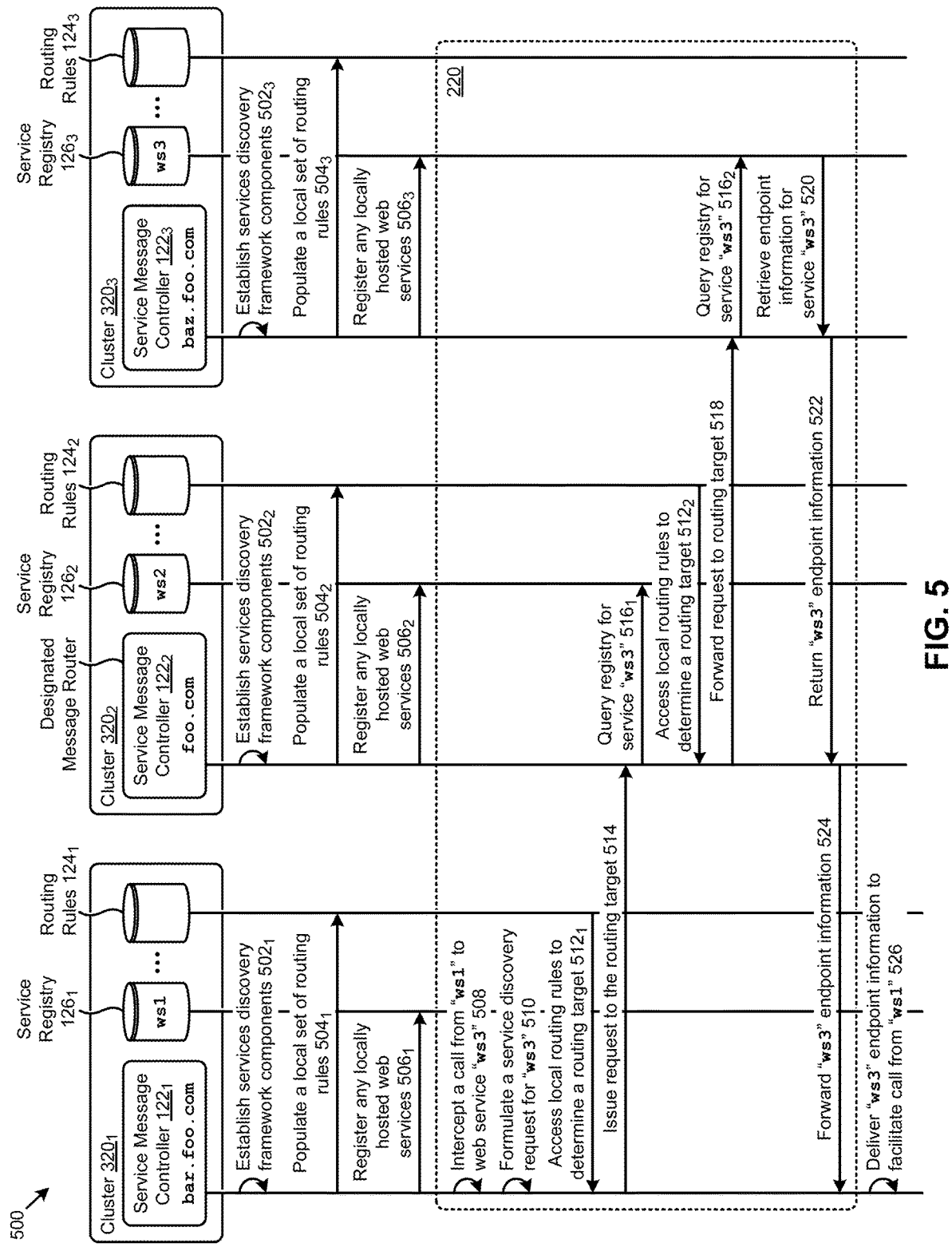
FIG. 5 presents a distributed web services discovery scenario as implemented in systems that facilitate discovery of web services in a distributed computing environment, according to an embodiment.

FIG. 5 presents a distributed web services discovery scenario 500 as implemented in systems that facilitate discovery of web services in a distributed computing environment. As an option, one or more variations of distributed web services discovery scenario 500 or any aspect thereof may be implemented in the context of the architecture and functionality of the embodiments described herein. The distributed web services discovery scenario 500 or any aspect thereof may be implemented in any environment.

FIG. 5 illustrates aspects pertaining to implementing a services discovery framework in a distributed computing environment to facilitate access to web services by clients that have no knowledge of the endpoints of the web services. Specifically, the figure is being presented to illustrate a representative web services discovery scenario using an instance of the services discovery framework as implemented in three representative clusters of a computing environment. The scenario is illustrated at least in part by high order interactions (e.g., operations, messages, etc.) over the clusters. As shown, a portion of the interactions between the clusters constitute one embodiment of the discovery operations 220 of FIG. 2.

As shown in FIG. 5, distributed web services discovery scenario 500 involves a cluster $320_1$, a cluster $320_2$, and a cluster $320_3$ in the shown multicluster computing environment. Cluster $320_1$ is addressable as "bar.foo.com", cluster $320_2$ is addressable as "foo.com", and cluster $320_3$ is addressable as "baz.foo.com". At or near the moment in time the clusters are deployed, various components comprising an instance of a services discovery framework are implemented at the clusters (operation $502_1$, operation $502_2$, and operation $502_3$). Specifically, implemented at each cluster are respective local instances of a service message controller (e.g., service message controller $122_1$, service message controller $122_2$, and service message controller $122_3$), a set of routing rules (e.g., routing rules $124_1$, routing rules $124_2$, and routing rules $124_3$), a service registry (e.g., service registry $126_1$, service registry $126_2$, and service registry $126_3$), and/or other components that constitute the instance of the services discovery framework implemented over the clusters.

When the foregoing framework components are implemented, the local sets of routing rules are populated (message $504_1$, message $504_2$, and message $504_3$) and any locally hosted web services are registered (message $506_1$, message $506_2$, and message $506_3$). As can be observed, cluster $320_1$ hosts a web service "ws1", cluster $320_2$ hosts a web service "ws2", and cluster $320_3$ hosts a web service "ws3". Moreover, cluster $320_2$ is elected as a designated message router over the clusters.

When the clusters are deployed and the services discovery framework is established, web service "ws1" at cluster $320_1$ might issue a call to "ws3.baz.foo.com" to access web service "ws3". While "ws1" might know the domain name (e.g., FQDN) of "ws3", "ws1" has no knowledge of the endpoint information (e.g., IP address) associated with "ws3". According to the herein disclosed techniques, the call is intercepted by service message controller $122_1$ (operation 508). A service discovery request to retrieve the endpoint information for the subject web service "ws3" is formulated on behalf of "ws1" (operation 510). Service message controller $122_1$ accesses the routing rules $124_1$ to determine a routing target (message $512_1$) and issues the request to the routing target (message 514), which is cluster $320_2$ at "foo.com" (e.g., the designated message router).

Service message controller $122_2$ at cluster $320_2$ receives the request and queries the service registry $126_2$ for the subject web service "ws3" (message $516_1$). Since "ws3" is not hosted at cluster $320_2$, the endpoint information for "ws3" will not be found in the local service registry. As such, service message controller $122_2$ will access routing rules $124_2$ to determine a routing target for the request (message 5122). Service message controller $122_2$ then forwards the request to the routing target (message 518), which, in this example is cluster $320_3$ at "baz.foo.com".

Service message controller $122_3$ at cluster $320_3$ receives the request and queries the service registry $126_3$ for the subject web service "ws3" (message 5162). Since "ws3" is hosted at cluster $320_3$, the endpoint information for "ws3" is retrieved (message 520). The endpoint information is returned to cluster $320_2$ (message 522), which then forwards it to cluster $320_1$ (message 524). The endpoint information is then delivered to web service "ws1" to facilitate the call to web service "ws3" (operation 526).

Figure 6:
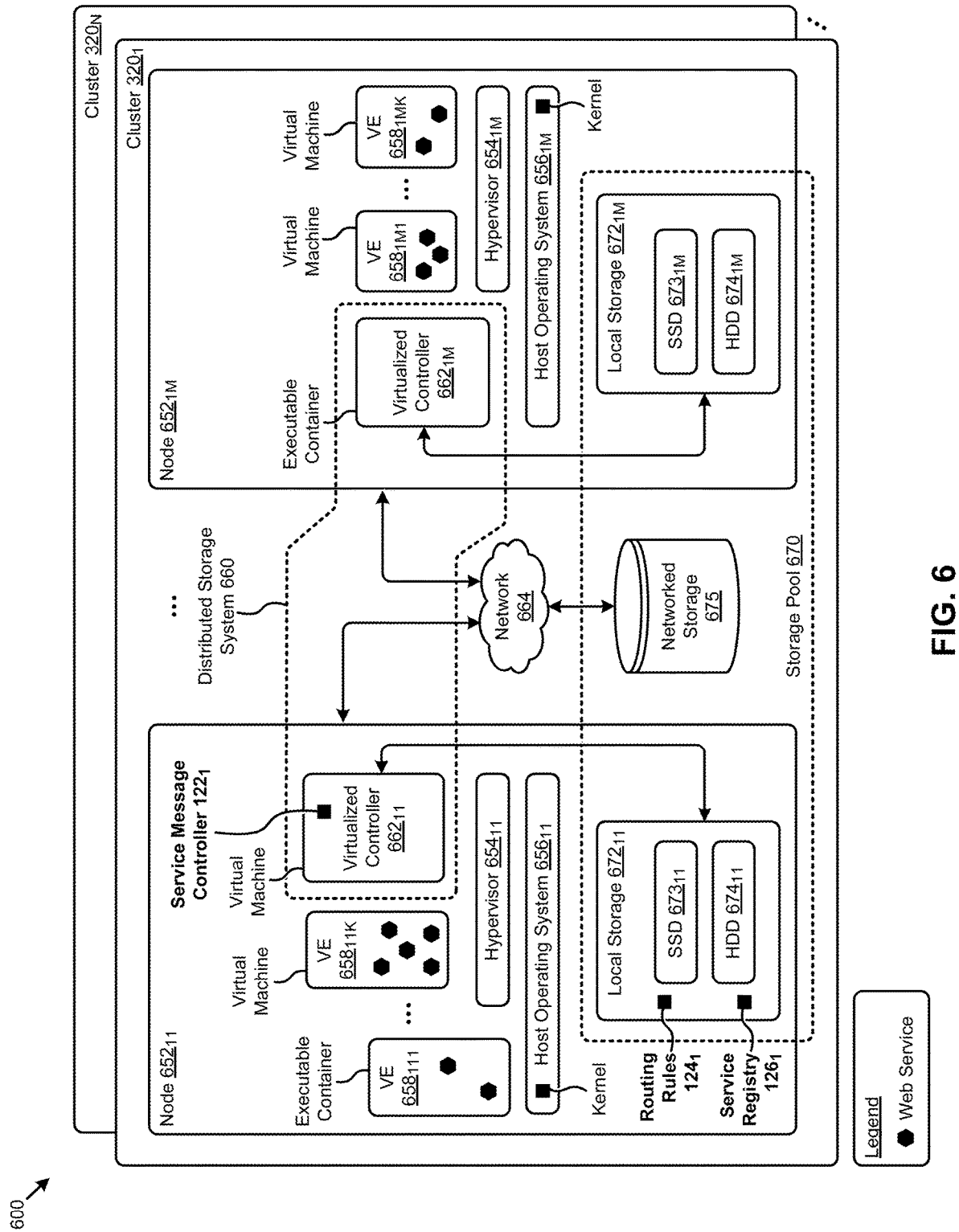
FIG. 6 presents a distributed virtualization environment that hosts system components used for discovery of web services that are deployed across distributed computing clusters, according to some embodiments.

An example of a distributed virtualization environment (e.g., multicluster distributed computing environment, etc.) that supports any of the herein disclosed techniques is presented and discussed as pertains to FIG. 6.

FIG. 6 presents a distributed virtualization environment 600 that hosts system components used for discovery of web services that are deployed across distributed computing clusters. As an option, one or more variations of distributed virtualization environment 600 or any aspect thereof may be implemented in the context of the architecture and functionality of the embodiments described herein. The distributed virtualization environment 600 or any aspect thereof may be implemented in any environment.

FIG. 6 illustrates aspects pertaining to implementing a services discovery framework in a distributed computing environment to facilitate access to web services by clients that have no knowledge of the endpoints of the web services. Specifically, the figure presents a logical depiction of how the herein disclosed techniques can be implemented in a virtualized distributed computing environment to facilitate discovery of web services deployed in the environment by clients that have no knowledge of the endpoint information associated with web services.

The shown distributed virtualization environment depicts various components associated with instances of distributed virtualization systems (e.g., hyperconverged distributed systems) that can be used to implement the herein disclosed techniques. Specifically, the distributed virtualization environment 600 comprises multiple clusters (e.g., cluster $320_1$, . . . , cluster $320_N$) comprising multiple nodes that have multiple tiers of storage in a storage pool. Representative nodes (e.g., node $652_{11}$, . . . , node $652_{1M}$) and storage pool 670 associated with cluster $320_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}$, . . . , local storage $672_{1M}$). For example, the local storage can be within or directly attached to a server and/or appliance associated with the nodes. Such local storage can include solid state drives (SSD $673_{11}$, . . . , SSD $673_{1M}$), hard disk drives (HDD $674_{11}$, . . . , HDD $674_{1M}$), and/or other storage devices.

As shown, any of the nodes of the distributed virtualization environment 600 can implement one or more user virtualized entities (e.g., VE $658_{111}$, . . . , VE $658_{11K}$, . . . , VE $658_{1M1}$, . . . , VE $658_{1MK}$), such as virtual machines (VMs) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}$, . . . , host operating system $656_{1M}$), while the VMs run multiple applications on various respective guest operating systems. Such flexibility can be facilitated at least in part by a hypervisor (e.g., hypervisor $654_{11}$, . . . , hypervisor $654_{1M}$), which hypervisor is logically located between the various guest operating systems of the VMs and the host operating system of the physical infrastructure (e.g., node).

As an alternative, executable containers may be implemented at the nodes in an operating system-based virtualization environment or container virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $656_{11}$, . . . , host operating system $656_{1M}$) without, in most cases, a hypervisor layer. This lightweight implementation can facilitate efficient distribution of certain software components, such as applications or services (e.g., micro-services). Any node of a distributed virtualization environment 600 can implement both a hypervisor-assisted virtualization environment and a container virtualization environment for various purposes. Also, any node in a distributed virtualization environment can implement a virtualized controller to facilitate access to storage pool 670 by the VMs and/or the executable containers.

As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor).

Multiple instances of such virtualized controllers can coordinate within a cluster to form the distributed storage system 660 which can, among other operations, manage the storage pool 670. This architecture further facilitates efficient scaling in multiple dimensions (e.g., in a dimension of computing power, in a dimension of storage space, in a dimension of network bandwidth, etc.).

The foregoing virtualized controllers can be implemented in the distributed virtualization environment using various techniques. As one specific example, an instance of a virtual machine at a given node can be used as a virtualized controller in a hypervisor-assisted virtualization environment to manage storage and I/O (input/output or IO) activities. In this case, for example, the virtualized entities at node $652_{11}$ can interface with a controller virtual machine (e.g., virtualized controller $662_{11}$) through hypervisor $654_{11}$ to access the storage pool 670. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660. For example, a hypervisor at one node in the distributed storage system 660 might correspond to software from a first vendor, and a hypervisor at another node in the distributed storage system 660 might correspond to a second software vendor. As another virtualized controller implementation example, executable containers (e.g., Docker containers) can be used to implement a virtualized controller (e.g., virtualized controller $662_{1M}$) in an operating system virtualization environment at a given node. In this case, for example, the virtualized entities at node $652_{1M}$ can access the storage pool 670 by interfacing with a controller container (e.g., virtualized controller $662_{1M}$) through hypervisor $654_{1M}$ and/or the kernel of host operating system $656_{1M}$.

In certain embodiments, one or more instances of an agent can be implemented in the distributed storage system 660 to facilitate the herein disclosed techniques. Specifically, agent $604_{11}$ can be implemented in the virtualized controller $662_{11}$, and agent $604_{1M}$ can be implemented in the virtualized controller $662_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

As earlier described, the problems attendant to maintaining (e.g., publishing, updating, etc.) information that describes the endpoints of numerous web services (e.g., microservices) deployed over highly scalable distributed computing systems can be addressed in the context of the foregoing environment. Moreover, any aspect or aspects of implementing a services discovery framework in a distributed computing environment to facilitate access to web services by clients that have no knowledge of the endpoints of the web services can be implemented in the context of the foregoing environment.

In certain embodiments, one or more components of a services discovery framework can be implemented in the distributed storage system 660 to facilitate the herein disclosed techniques. Specifically, service message controller $122_1$ can be implemented in virtualized controller $662_{11}$. Such instances of the virtualized controller and/or its agents (e.g., service message controller) can be implemented in any node in any cluster. Actions taken by one or more instances of the virtualized controller can apply to a node (or between nodes), and/or to a cluster (or between clusters), and/or between any resources or subsystems accessible by the virtualized controller or their agents (e.g., service message controller). In some cases, a virtualized controller in a cluster is selected (e.g., elected as leader) to serve as a designated access point for the cluster and/or a group of clusters. In such cases, the instance of the service message controller associated with the selected virtualized controller might be activated while other instances of the service message controller in the cluster or clusters might be deactivated. Various instances and/or portions (e.g., partitions, extents, extent groups, etc.) of a set of routing rules (e.g., routing rules $124_1$) and/or a service registry (e.g., service registry $126_1$) might be distributed across each cluster to facilitate reliable accessibility (e.g., fault tolerance) by the associated instance of the service message controller to carry out the herein disclosed techniques.

Additional Embodiments of the Disclosure

Additional Practical Application Examples

Figure 7A:
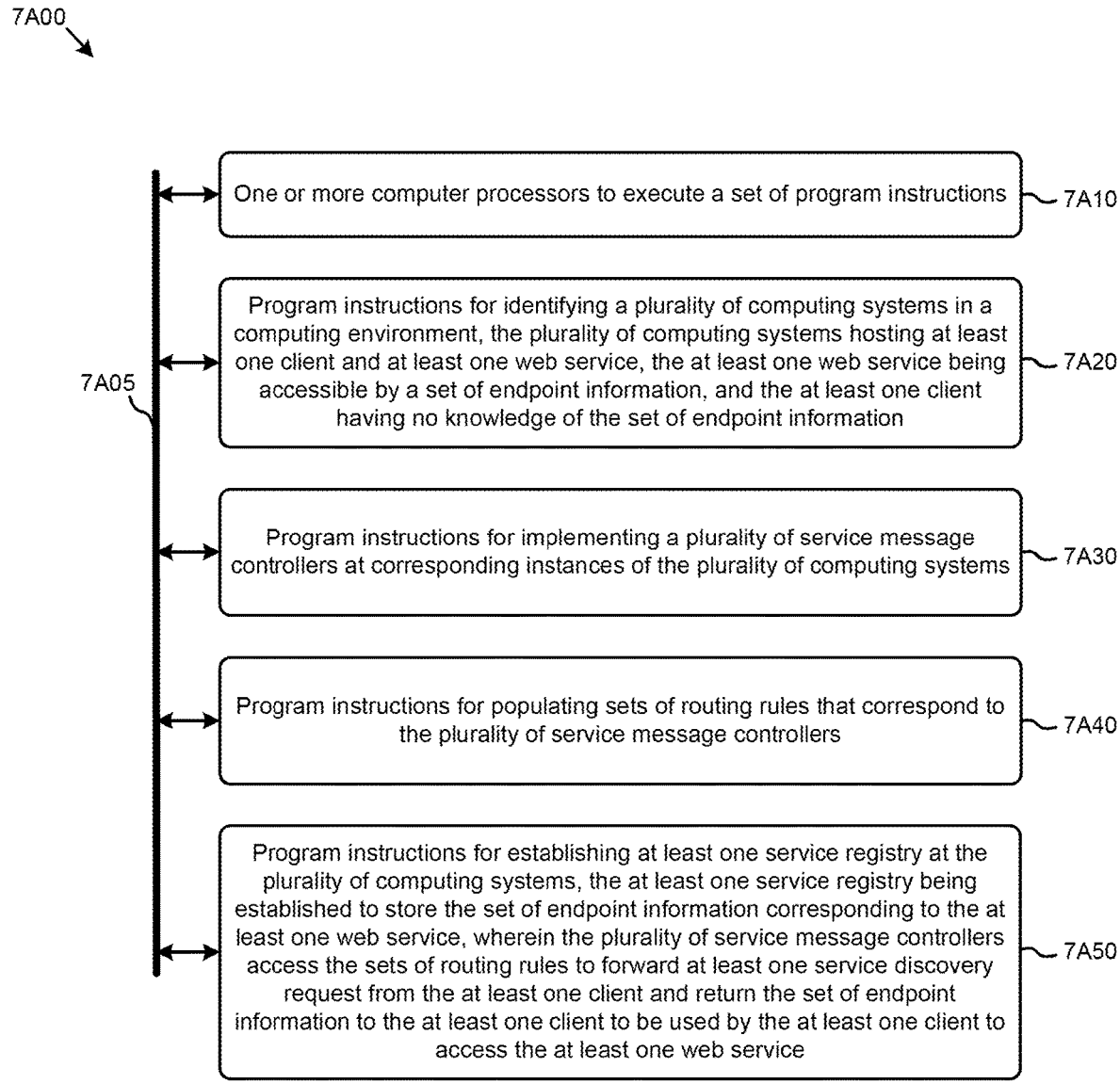
FIG. 7A, FIG. 7B, and FIG. 7C depict system components as arrangements of computing modules that are interconnected so as to implement certain of the herein-disclosed embodiments.

FIG. 7A depicts a system 7A00 as an arrangement of computing modules that are interconnected so as to operate cooperatively to implement certain of the herein-disclosed embodiments. This and other embodiments present particular arrangements of elements that, individually or as combined, serve to form improved technological processes that address maintaining (e.g., publishing, updating, etc.) information that describes the endpoints of numerous web services (e.g., microservices) deployed over highly scalable distributed computing systems. The partitioning of system 7A00 is merely illustrative and other partitions are possible. As an option, the system 7A00 may be implemented in the context of the architecture and functionality of the embodiments described herein. Of course, however, the system 7A00 or any operation therein may be carried out in any desired environment.

The system 7A00 comprises at least one processor and at least one memory, the memory serving to store program instructions corresponding to the operations of the system. As shown, an operation can be implemented in whole or in part using program instructions accessible by a module. The modules are connected to a communication path 7A05, and any operation can communicate with any other operations over communication path 7A05. The modules of the system can, individually or in combination, perform method operations within system 7A00. Any operations performed within system 7A00 may be performed in any order unless as may be specified in the claims.

The shown embodiment implements a portion of a computer system, presented as system 7A00, comprising one or more computer processors to execute a set of program code instructions (module 7A10) and modules for accessing memory to hold program code instructions to perform: identifying a plurality of computing systems in a computing environment, the plurality of computing systems hosting at least one client and at least one web service, the at least one web service being accessible by a set of endpoint information, and the at least one client having no knowledge of the set of endpoint information (module 7A20); implementing a plurality of service message controllers at corresponding instances of the plurality of computing systems (module 7A30); populating sets of routing rules that correspond to the plurality of service message controllers (module 7A40); and establishing at least one service registry at the plurality of computing systems, the at least one service registry being established to store the set of endpoint information corresponding to the at least one web service, wherein the plurality of service message controllers access the sets of routing rules to forward at least one service discovery request from the at least one client and return the set of endpoint information to the at least one client to be used by the at least one client to access the at least one web service (module 7A50).

Variations of the foregoing may include more or fewer of the shown modules. Certain variations may perform more or fewer (or different) steps and/or certain variations may use data elements in more, or in fewer, or in different operations. Strictly as examples, some embodiments are configured where the sets of routing rules identify at least one routing target by a convention. Some embodiments include additional steps for electing a computing system from the plurality of computing systems, and then augmenting the sets of routing rules associated with the elected computing system so as to identify a plurality of routing targets. In some cases, a routing target is selected from the plurality of routing targets based on a domain name or a subdomain name that is associated a web service.

Still further, some embodiments include variations in the operations performed, and some embodiments include variations of aspects of the data elements used in the operations.

Figure 7B:
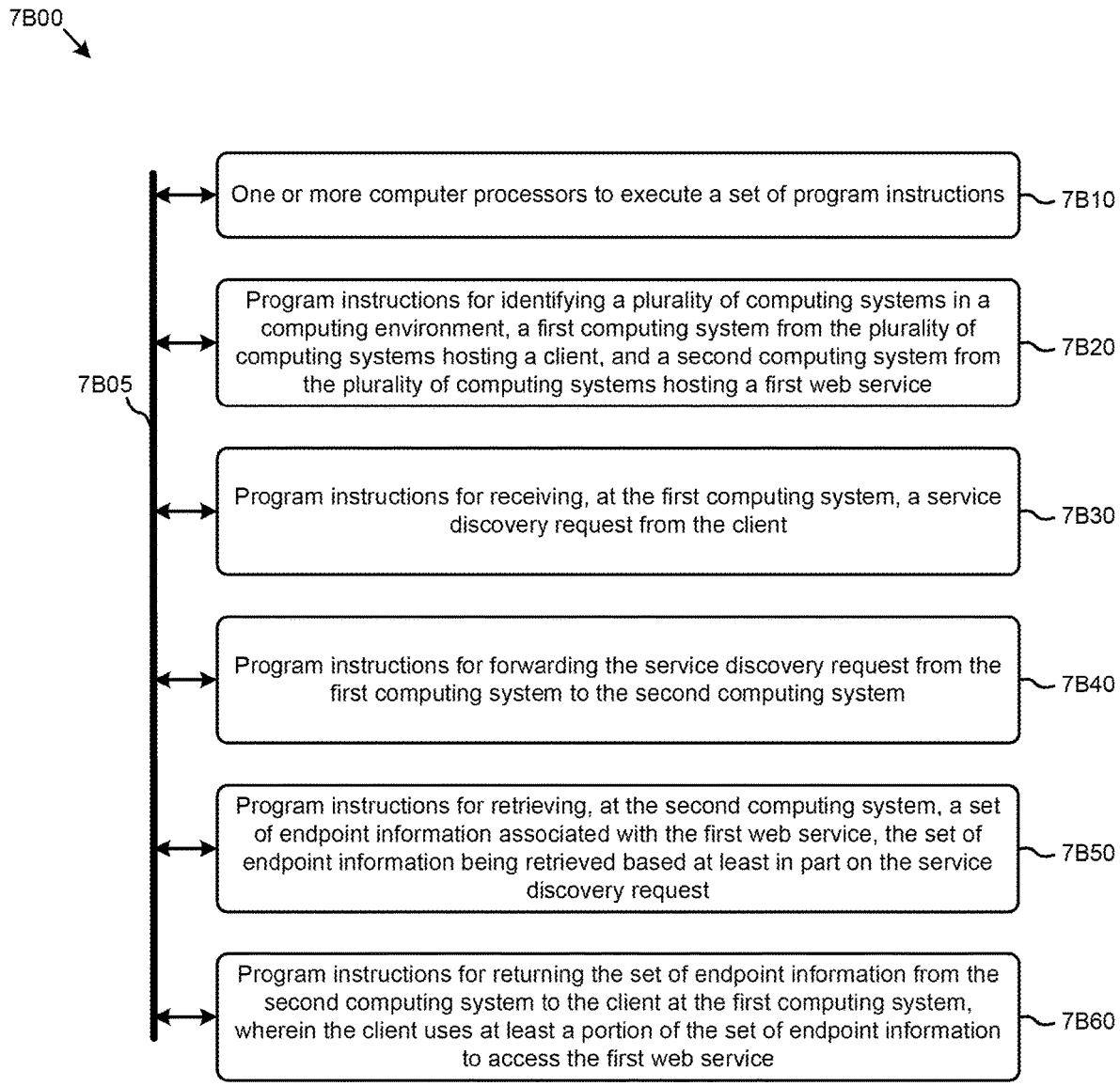

FIG. 7B depicts a system 7B00 as an arrangement of computing modules that are interconnected so as to operate cooperatively to implement certain of the herein-disclosed embodiments. The partitioning of system 7B00 is merely illustrative and other partitions are possible. As an option, the system 7B00 may be implemented in the context of the architecture and functionality of the embodiments described herein. Of course, however, the system 7B00 or any operation therein may be carried out in any desired environment.

The system 7B00 comprises at least one processor and at least one memory, the memory serving to store program instructions corresponding to the operations of the system. As shown, an operation can be implemented in whole or in part using program instructions accessible by a module. The modules are connected to a communication path 7B05, and any operation can communicate with any other operations over communication path 7B05. The modules of the system can, individually or in combination, perform method operations within system 7B00. Any operations performed within system 7B00 may be performed in any order unless as may be specified in the claims.

The shown embodiment implements a portion of a computer system, presented as system 7B00, comprising one or more computer processors to execute a set of program code instructions (module 7B10) and modules for accessing memory to hold program code instructions to perform: identifying a plurality of computing systems in a computing environment, a first computing system from the plurality of computing systems hosting a client, and a second computing system from the plurality of computing systems hosting a first web service (module 7B20); receiving, at the first computing system, a service discovery request from the client (module 7B30); forwarding the service discovery request from the first computing system to the second computing system (module 7B40); retrieving, at the second computing system, a set of endpoint information associated with the first web service, the set of endpoint information being retrieved based at least in part on the service discovery request (module 7B50); and returning the set of endpoint information from the second computing system to the client at the first computing system, wherein the client uses at least a portion of the set of endpoint information to access the first web service (module 7B60).

Still further, some embodiments include variations in the operations performed, and some embodiments include variations of aspects of the data elements used in the operations. Strictly as examples, The method may comprise variations wherein at least one of the forwarding of the service discovery request or the returning of the set of endpoint information traverses three or more computing systems, and/or wherein a first set of routing rules are accessed to perform a first set of routing operations at the first computing system, and/or wherein a second set of routing rules are accessed to perform a second set of routing operations at the second computing system.

In some embodiments the routing operations may perform forwarding of the service discovery request to the second computing system and/or returning of the set of endpoint information that is stored in a service registry at the second computing system.

As can be seen, the foregoing method supports web service location discovery when no portion of the set of endpoint information is known by the client prior to the set of endpoint information being returned to the client. As such, a web service can be discovered by a web app that has the name of the web service but does not have the location of the web service. More particularly, although the web service location discovery request may comprise any one or more of, a name, a path, a domain name, or a subdomain name associated with the web service, the web app does not have the full set of information needed to form a call to the web service endpoint.

In some embodiments, the web service endpoint comprises a uniform resource identifier, or a uniform resource locator, and/or a fully qualified domain name, and/or an IP address, and/or a port, and/or a hostname.

Figure 7C:
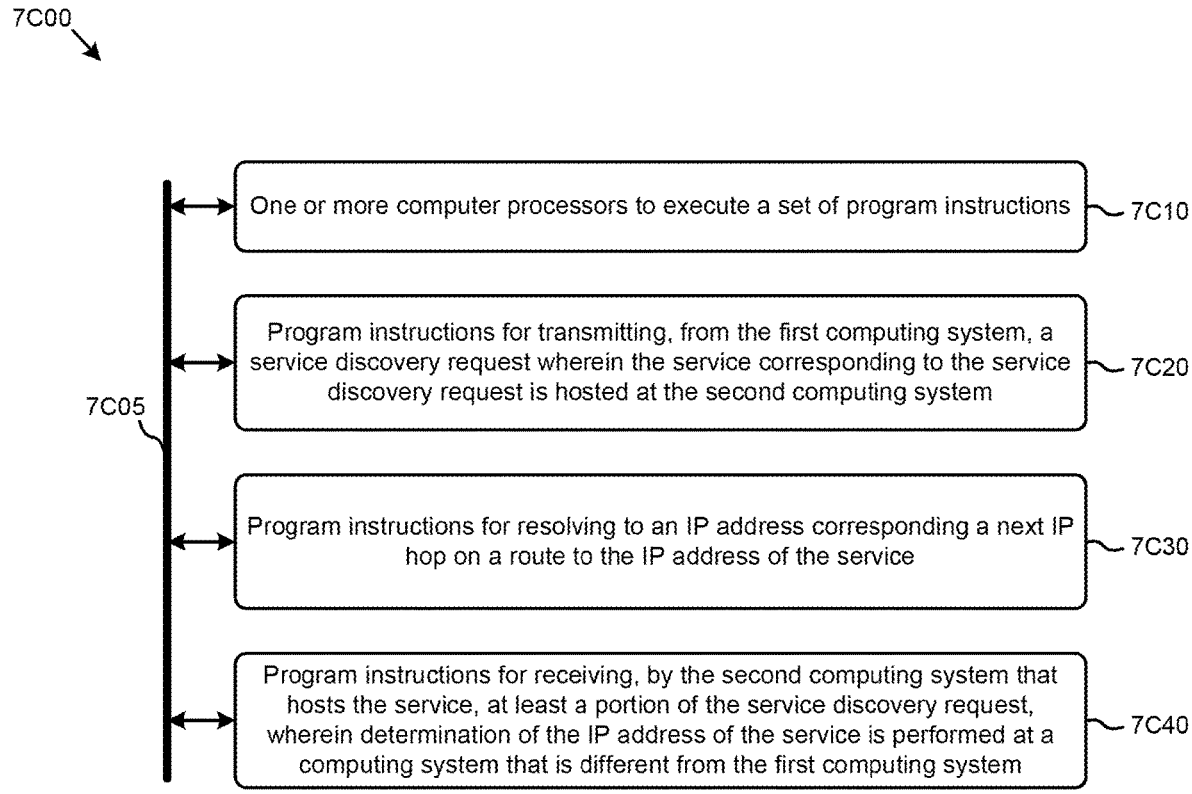

FIG. 7C depicts a system 7C00 as an arrangement of computing modules that are interconnected so as to operate cooperatively to implement certain of the herein-disclosed embodiments. The partitioning of system 7C00 is merely illustrative and other partitions are possible. As an option, the system 7C00 may be implemented in the context of the architecture and functionality of the embodiments described herein. Of course, however, the system 7C00 or any operation therein may be carried out in any desired environment. The system 7C00 comprises at least one processor and at least one memory, the memory serving to store program instructions corresponding to the operations of the system. As shown, an operation can be implemented in whole or in part using program instructions accessible by a module. The modules are connected to a communication path 7C05, and any operation can communicate with any other operations over communication path 7C05. The modules of the system can, individually or in combination, perform method operations within system 7C00. Any operations performed within system 7C00 may be performed in any order unless as may be specified in the claims. The shown embodiment implements a portion of a computer system, presented as system 7C00, comprising one or more computer processors to execute a set of program code instructions (module 7C10) and modules for accessing memory to hold program code instructions to perform: transmitting, from the first computing system, a service discovery request wherein the service corresponding to the service discovery request is hosted at the second computing system (module 7C20); resolving to an IP address corresponding a next IP hop on a route to the IP address of the service (module 7C30); and receiving, by the second computing system that hosts the service, at least a portion of the service discovery request, wherein determination of the IP address of the service is performed at a computing system that is different from the first computing system (module 7C40).

The operations performed within system 7C00 can be described from the perspective of the second computing system that hosts the service. Specifically, in an environment having a first computing system that hosts a client and a second computing system that hosts a service, the second computing system receives, from the first computing system, a service discovery request. Responsive to the service discovery request, the second computing system that hosts the service then transmits a response to the requestor.

System Architecture Overview

Additional System Architecture Examples

Figure 8A:
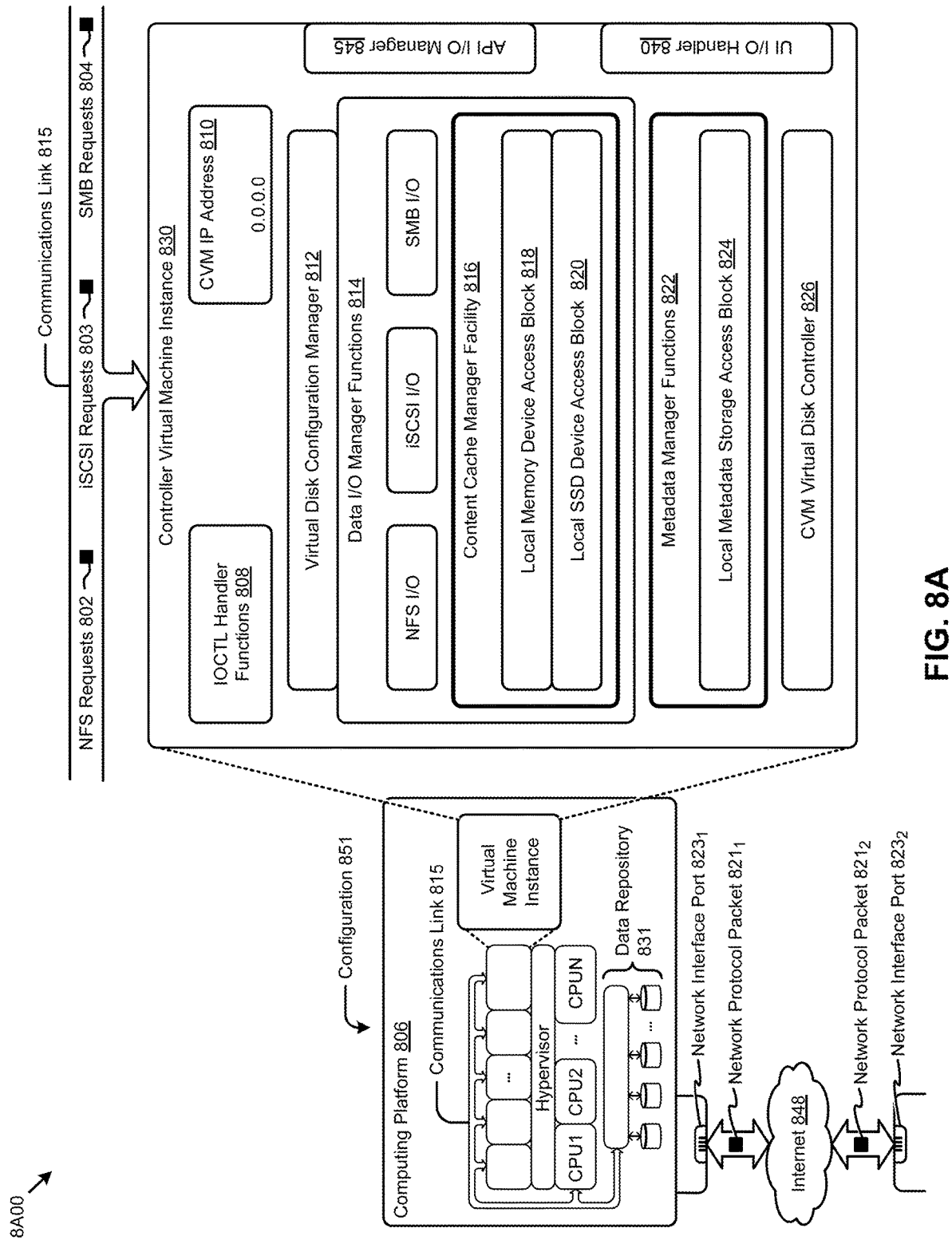
FIG. 8A, FIG. 8B, and FIG. 8C depict virtualized controller architectures comprising collections of interconnected components suitable for implementing embodiments of the present disclosure and/or for use in the herein-described environments.

FIG. 8A depicts a virtualized controller as implemented by the shown virtual machine architecture 8A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 8A00 comprises a collection of interconnected components suitable for implementing embodiments of the present disclosure and/or for use in the herein-described environments. Moreover, virtual machine architecture 8A00 includes a virtual machine instance in configuration 851 that is further described as pertaining to controller virtual machine instance 830. Configuration 851 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 830.

In this and other configurations, a controller virtual machine instance receives block I/O storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output can be handled by one or more IO control handler functions (e.g., IOCTL handler functions 808) that interface to other functions such as data IO manager functions 814 and/or metadata manager functions 822. As shown, the data IO manager functions can include communication with virtual disk configuration manager 812 and/or can include direct or indirect communication with any of various block IO functions (e.g., NFS IO, iSCSI IO, SMB IO, etc.).

In addition to block IO functions, configuration 851 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through API IO manager 845.

Communications link 815 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 830 includes content cache manager facility 816 that accesses storage locations, possibly including local dynamic random access memory (DRAM) (e.g., through local memory device access block 818) and/or possibly including accesses to local solid state storage (e.g., through local SSD device access block 820).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 831, which in turn can be formatted into any one or more storage areas, and which can comprise parameterized storage accessible by a key (e.g., a filename, a table name, a block address, an offset address, etc.). Data repository 831 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 824. The data repository 831 can be configured using CVM virtual disk controller 826, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 851 can be coupled by communications link 815 (e.g., backplane, LAN, PSTN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). Configuration 851 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

Computing platform 806 may transmit and receive messages that can be composed of configuration data and/or any other forms of data and/or instructions organized into a data structure (e.g., communications packets). In some cases, the data structure includes program instructions (e.g., application code) communicated through the Internet 848 and/or through any one or more instances of communications link 815. Received program instructions may be processed and/or executed by a CPU as it is received and/or program instructions may be stored in any volatile or non-volatile storage for later execution. Program instructions can be transmitted via an upload (e.g., an upload from an access device over the Internet 848 to computing platform 806). Further, program instructions and/or the results of executing program instructions can be delivered to a particular user via a download (e.g., a download from computing platform 806 over the Internet 848 to an access device).

Configuration 851 is merely one sample configuration. Other configurations or partitions can include further data processors, and/or multiple communications interfaces, and/ or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to discovery of web services deployed in distributed computing environments. In some embodiments, a module may include one or more state machines and/or combinational logic used to implement or facilitate the operational and/or performance characteristics pertaining to discovery of web services deployed in distributed computing environments.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of discovery of web services deployed in distributed computing environments). Such files or records can be brought into and/or stored in volatile or non-volatile memory. More specifically, the occurrence and organization of the foregoing files, records, and data structures improve the way that the computer stores and retrieves data in memory, for example, to improve the way microservices are accessed when the computer is performing operations pertaining to discovery of web services deployed in distributed computing environments, and/or for improving the way IP addresses are manipulated when performing computerized operations pertaining to implementing a services discovery framework in a distributed computing environment (e.g., to facilitate access to web services by clients that have no knowledge of the endpoints of the web services).

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 8B:
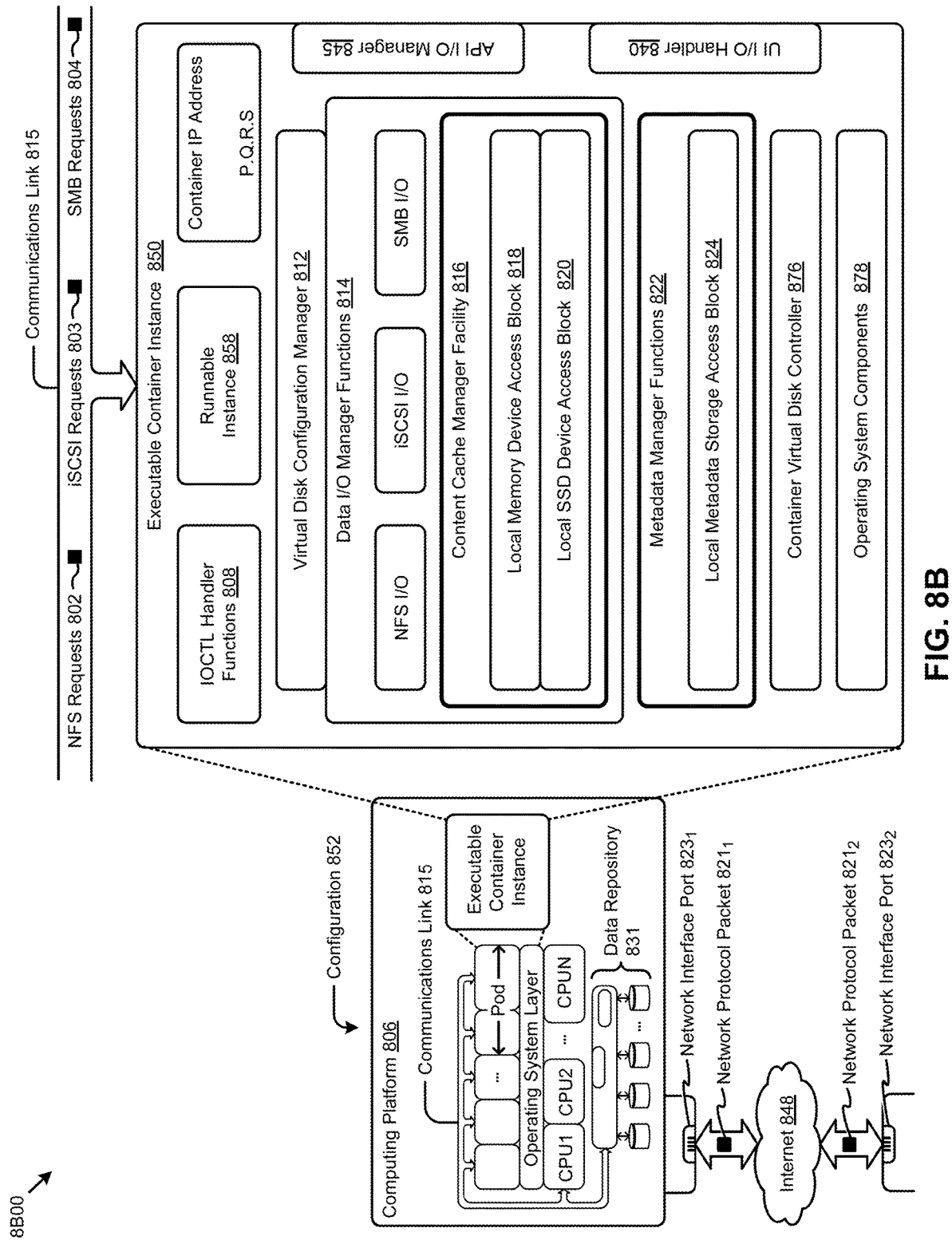

FIG. 8B depicts a virtualized controller implemented by containerized architecture 8B00. The containerized architecture comprises a collection of interconnected components suitable for implementing embodiments of the present disclosure and/or for use in the herein-described environments. Moreover, the shown containerized architecture 8B00 includes an executable container instance in configuration 852 that is further described as pertaining to executable container instance 850. Configuration 852 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 850). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 878, however such a separate set of operating system components need not be provided. As an alternative, an executable container can include runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 8C:
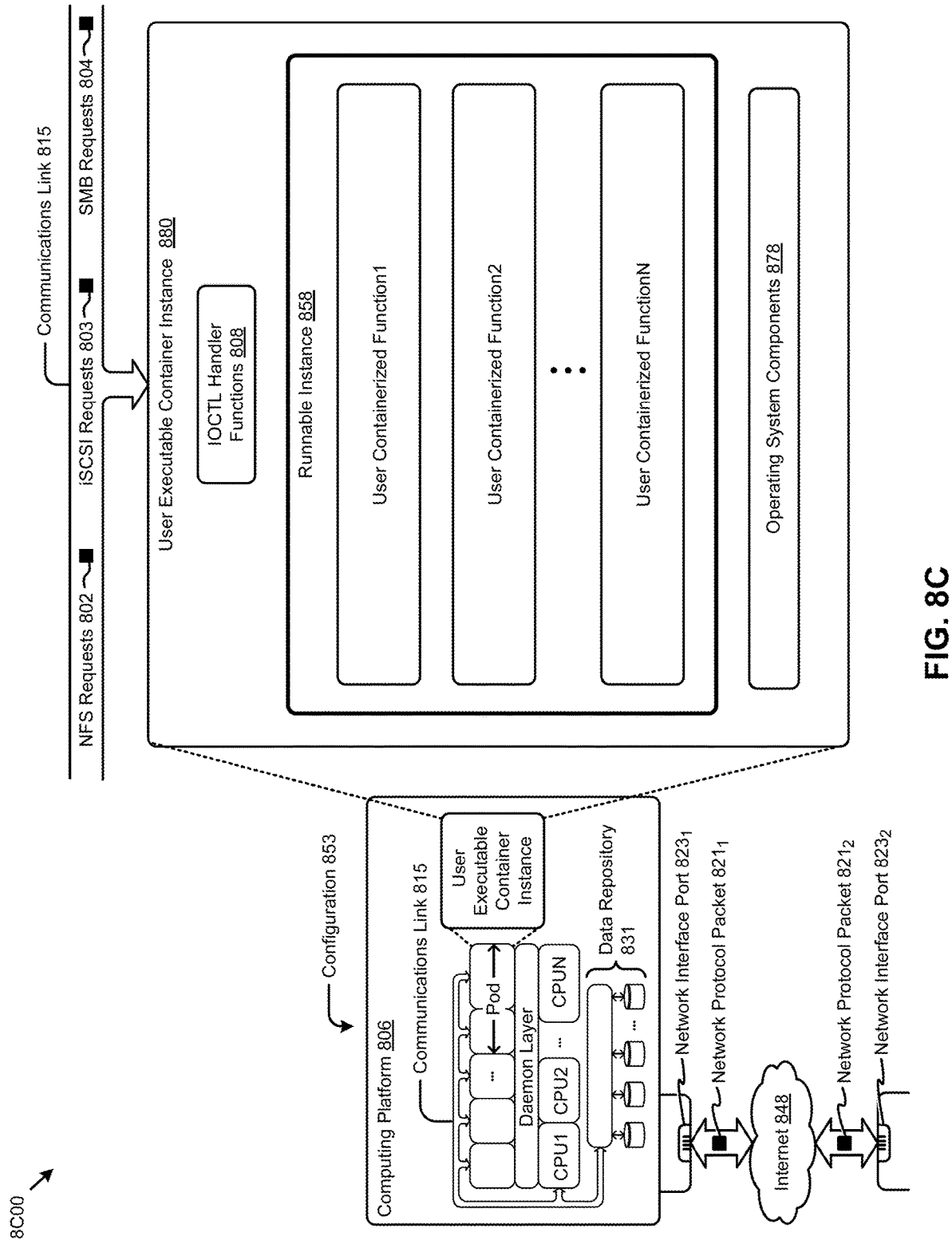

FIG. 8C depicts a virtualized controller implemented by a daemon-assisted containerized architecture 8C00. The containerized architecture comprises a collection of interconnected components suitable for implementing embodiments of the present disclosure and/or for use in the herein-described environments. Moreover, the shown daemon-assisted containerized architecture includes a user executable container instance in configuration 853 that is further described as pertaining to user executable container instance 880. Configuration 853 includes a daemon layer (as shown) that performs certain functions of an operating system.

User executable container instance 880 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 858). In some cases, the shown operating system components 878 comprise portions of an operating system, which portions are interfaced with or included in the runnable instance and/or any user containerized functions. In this embodiment of a daemon-assisted containerized architecture, the computing platform 806 might or might not host operating system components other than operating system components 878. More specifically, the shown daemon might or might not host operating system components other than operating system components 878 of user executable container instance 880.

The virtual machine architecture 8A00 of FIG. 8A and/or the containerized architecture 8B00 of FIG. 8B and/or the daemon-assisted containerized architecture 8C00 of FIG. 8C can be used in any combination to implement a distributed platform that contains multiple servers and/or nodes that manage multiple tiers of storage where the tiers of storage might be formed using the shown data repository 831 and/or any forms of network accessible storage. As such, the multiple tiers of storage may include storage that is accessible over communications link 815. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 851 of FIG. 8A) to manage the interactions between the underlying hardware and user virtual machines or containers that run client software.

Distinct from user virtual machines or user executable containers, a special controller virtual machine (e.g., as depicted by controller virtual machine instance 830) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when executed by a processor causes a set of acts for facilitating discovery of services for clients at respective service endpoints in a distributed system, the set of acts comprising:

receiving, at a designated access point computer in a cluster, a service discovery request from a client, wherein a service corresponding to the service discovery request is hosted at a service endpoint and is accessible over a network, the service comprising a resource accessible over a network that is usable to perform a function for the client;

resolving, at the designated access point computer, a next network endpoint corresponding to a network hop on a route to the service endpoint for the service by using at least a registry stored at the designated access point computer, wherein the service endpoint of the service is determined based at least in part upon the registry stored at the designated access point computer; and receiving, from the next network endpoint or the service endpoint, a response comprising address information provided by the service endpoint, wherein the address information is usable by the client to directly access the service at the service endpoint.

2. The non-transitory computer readable medium of claim 1, wherein the set of acts further comprise forming a network protocol packet in response to receiving the service discovery request at the designated access point computer, wherein the network protocol packet comprises separate network endpoint information for the service endpoint.

3. The non-transitory computer readable medium of claim 1, wherein the service endpoint or the next network endpoint is determined from a respective registry locally stored at a respective computer, and the respective registry comprises endpoint information of at least one service hosted on the respective computer.

4. The non-transitory computer readable medium of claim 1, wherein the service discovery request comprises a name of the service, and the next network endpoint resolves the service endpoint of the service at least by querying a separate registry using the name of the service, the separate registry stored locally on the next network endpoint.

5. The non-transitory computer readable medium of claim 1, wherein the set of acts further comprise receiving a call, from the client, to the service hosted on the service endpoint by using at least the address information in the response, wherein the designated access point computer tracks endpoint information of at least the next network endpoint using at least endpoint information in the registry and consults at least one routing rule locally stored on the designated access point computer to determine the next network endpoint, and a separate computer different from the designated access point computer determines the service endpoint of the service at least by querying a separate registry locally stored at the separate computer.

6. The non-transitory computer readable medium of claim 1, wherein the service discovery request comprises a name of the service, and the name of the service is respectively used by the designated access point computer and the next network endpoint to determine respective routing targets.

7. The non-transitory computer readable medium of claim 1, wherein the service endpoint of the service is identified by at least one of a uniform resource identifier, uniform resource locator, a fully qualified domain name, or a port.

8. A method for facilitating discovery of services for clients at respective service endpoints in a distributed system, the method comprising:

receiving, at a designated access point computer in a cluster, a service discovery request from a client, wherein a service corresponding to the service discovery request is hosted at a service endpoint and is accessible over a network, the service comprising a resource accessible over a network that is usable to perform a function for the client;

resolving, at the designated access point computer, a next network endpoint corresponding to a network hop on a route to the service endpoint for the service by using at least a registry stored at the designated access point computer, wherein the service endpoint of the service is determined based at least in part upon the registry stored at the designated access point computer; and receiving, from the next network endpoint or the service endpoint, a response comprising address information provided by the service endpoint, wherein the address information is usable by the client to directly access the service at the service endpoint.

9. The method of claim 8, further comprising, forming a network protocol packet in response to receiving the service discovery request at the designated access point computer, wherein the network protocol packet comprises information of the service endpoint of the service endpoint.

10. The method of claim 8, wherein the designated access point computer determines the next network endpoint at least by querying the registry using at least a name of the service.

11. The method of claim 8, wherein the service discovery request comprises a name of the service, and the next network endpoint resolves the service endpoint of the service at least by querying a separate registry using the name of the service, the separate registry stored locally at the next network endpoint.

12. The method of claim 8, further comprising forwarding the service discovery request through two or more network hops, the two or more network hops comprising the next network endpoint and a subsequent network endpoint between the designated access point computer and the service endpoint, wherein the next network endpoint determines the subsequent network endpoint at least by querying the registry stored locally on the next network endpoint with a name of the service, and the subsequent network endpoint determines the service endpoint or a separate network endpoint for reaching the service endpoint at least by querying a separate registry stored locally on the subsequent network endpoint with the name of the service.

13. The method of claim 8, wherein the service endpoint or the next network endpoint is determined from a respective registry locally stored at a respective computer, and the respective registry comprises endpoint information of at least one service hosted on the respective computer.

14. The method of claim 8, further comprising calling, by the client, the service hosted on the service endpoint by using at least the address information in the response, wherein the designated access point computer tracks endpoint information of at least the next network endpoint using at least endpoint information in the registry and consults at least one routing rule locally stored on the designated access point computer to determine the next network endpoint.

15. The method of claim 8, wherein the service discovery request comprises a name of the service, and the name of the service is respectively used by the designated access point computer and the next network endpoint to determine respective routing targets.

16. The method of claim 8, wherein the service endpoint of the service comprises at least one of a uniform resource identifier, uniform resource locator, a fully qualified domain name, or a port.

17. A system for facilitating discovery of services for clients at respective service endpoints in a distributed system, comprising:
a non-transitory storage medium having stored thereon a sequence of instructions; and
a processor that executes the sequence of instructions, execution of the sequence of instruction causing a set of acts, the set of acts comprising,
receiving, at a designated access point computer in a cluster, a service discovery request from a client, wherein a service corresponding to the service discovery request is hosted at a service endpoint and is accessible over a network, the service comprising a resource accessible over a network that is usable to perform a function for the client;
resolving, at the designated access point computer, a next network endpoint corresponding to a network hop on a route to the service endpoint for the service by using at least a registry stored at the designated access point computer, wherein the service endpoint of the service is determined based at least in part upon the registry stored at the designated access point computer; and
receiving, from the next network endpoint or the service endpoint, a response comprising address information provided by the service endpoint, wherein the address information is usable by the client to directly access the service at the service endpoint.

18. The system of claim 17, wherein the set of acts further comprise receiving a call, from the client, to the service hosted on the service endpoint by using at least the address information in the response, wherein the designated access point computer tracks endpoint information of at least the next network endpoint using at least endpoint information in the registry and consults at least one routing rule locally stored on the designated access point computer to determine the next network endpoint, and a separate computer different from the designated access point computer determines the service endpoint of the service at least by querying a separate registry locally stored at the separate computer.

19. The system of claim 17, further comprising a first service message controller, a multi-clustering service message controller, and a cluster routing service message controller that discover the service endpoint of the service for the client, wherein first service message controller is hierarchically superior to the multi-clustering service message controller, and the multi-clustering service message controller is hierarchically superior to the multi-clustering service message controller.

20. The system of claim 17, wherein the set of acts further comprise, forming a network protocol packet in response to receiving the service discovery request at the designated access point computer, wherein the network protocol packet comprises information of the service endpoint of the service endpoint.

21. The system of claim 17, wherein the service discovery request comprises a name of the service, and the next network endpoint resolves the service endpoint of the service at least by querying a separate registry using the name of the service, the separate registry stored locally at the next network endpoint.

22. The system of claim 17, wherein the service endpoint or the next network endpoint is determined from a respective registry locally stored at a respective computer, and the respective registry comprises endpoint information of at least one service hosted on the respective computer.

23. The system of claim 17, wherein the service discovery request comprises a name of the service, and the name of the service is respectively used by the designated access point computer and the next network endpoint to determine respective routing targets.

24. The system of claim 17, wherein the service endpoint of the service is identified by at least one of a uniform resource identifier, uniform resource locator, a fully qualified domain name, or a port.

* * * * *